US010261219B2

(12) United States Patent
Duparre et al.

(10) Patent No.: US 10,261,219 B2
(45) Date of Patent: *Apr. 16, 2019

(54) SYSTEMS AND METHODS FOR MANUFACTURING CAMERA MODULES USING ACTIVE ALIGNMENT OF LENS STACK ARRAYS AND SENSORS

(71) Applicant: FotoNation Limited, Galway (IE)

(72) Inventors: Jacques Duparre, Jena (DE); Andrew Kenneth John McMahon, San Carlos, CA (US); Dan Lelescu, Morgan Hill, CA (US)

(73) Assignee: FotoNation Limited (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,747

(22) Filed: Sep. 18, 2017

(65) Prior Publication Data
US 2018/0081090 A1 Mar. 22, 2018

Related U.S. Application Data

(63) Continuation of application No. 15/004,759, filed on Jan. 22, 2016, now Pat. No. 9,766,380, which is a
(Continued)

(51) Int. Cl.
*G02B 3/00* (2006.01)
*H04N 5/225* (2006.01)
(Continued)

(52) U.S. Cl.
CPC ......... *G02B 3/0075* (2013.01); *G02B 3/0062* (2013.01); *G02B 7/003* (2013.01);
(Continued)

(58) Field of Classification Search
CPC .... G02B 3/0062; G02B 3/0075; G02B 7/003; G02B 7/005; H04N 5/2254; H04N 5/2257; H04N 5/23212; H04N 17/002
(Continued)

(56) References Cited

U.S. PATENT DOCUMENTS

| 4,124,798 A | 11/1978 | Thompson |
| 4,198,646 A | 4/1980 | Alexander et al. |

(Continued)

FOREIGN PATENT DOCUMENTS

| CN | 1669332 A | 9/2005 |
| CN | 1839394 A | 9/2006 |

(Continued)

OTHER PUBLICATIONS

Sauer et al., "Parallel Computation of Sequential Pixel Updates in Statistical Tomographic Reconstruction", ICIP 1995 Proceedings of the 1995 International Conference on Image Processing, Date of Conference: Oct. 23-26, 1995, pp. 93-96.
(Continued)

*Primary Examiner* — Michael E Teitelbaum
*Assistant Examiner* — Sean N. Haiem
(74) *Attorney, Agent, or Firm* — KPPB LLP

(57) ABSTRACT

Systems and methods in accordance with embodiments of the invention actively align a lens stack array with an array of focal planes to construct an array camera module. In one embodiment, a method for actively aligning a lens stack array with a sensor that has a focal plane array includes: aligning the lens stack array relative to the sensor in an initial position; varying the spatial relationship between the lens stack array and the sensor; capturing images of a known target that has a region of interest using a plurality of active focal planes at different spatial relationships; scoring the images based on the extent to which the region of interest is
(Continued)

focused in the images; selecting a spatial relationship between the lens stack array and the sensor based on a comparison of the scores; and forming an array camera subassembly based on the selected spatial relationship.

15 Claims, 9 Drawing Sheets

Related U.S. Application Data continuation of application No. 13/782,920, filed on Mar. 1, 2013, now abandoned.

(60) Provisional application No. 61/666,852, filed on Jun. 30, 2012.

(51) Int. Cl.
*H04N 17/00* (2006.01)
*G02B 7/00* (2006.01)
*H04N 5/232* (2006.01)
*H04N 5/341* (2011.01)

(52) U.S. Cl.
CPC ............ *G02B 7/005* (2013.01); *H04N 5/2254* (2013.01); *H04N 5/2257* (2013.01); *H04N 5/23212* (2013.01); *H04N 5/3415* (2013.01); *H04N 17/002* (2013.01)

(58) Field of Classification Search
USPC ....... 348/187, 345, 218.1, 46; 382/131, 299, 382/154; 345/419; 257/294; 430/9
See application file for complete search history.

(56) References Cited

U.S. PATENT DOCUMENTS

| | | |
|---|---|---|
| 4,323,925 A | 4/1982 | Abell et al. |
| 4,460,449 A | 7/1984 | Montalbano |
| 4,467,365 A | 8/1984 | Murayama et al. |
| 4,652,909 A | 3/1987 | Glenn |
| 4,899,060 A | 2/1990 | Lischke |
| 4,962,425 A | 10/1990 | Rea |
| 5,005,083 A | 4/1991 | Grage |
| 5,070,414 A | 12/1991 | Tsutsumi |
| 5,144,448 A | 9/1992 | Hornbaker et al. |
| 5,157,499 A | 10/1992 | Oguma et al. |
| 5,325,449 A | 6/1994 | Burt |
| 5,327,125 A | 7/1994 | Iwase et al. |
| 5,463,464 A | 10/1995 | Ladewski |
| 5,488,674 A | 1/1996 | Burt |
| 5,629,524 A | 5/1997 | Stettner et al. |
| 5,638,461 A | 6/1997 | Fridge |
| 5,757,425 A | 5/1998 | Barton et al. |
| 5,793,900 A | 8/1998 | Nourbakhsh et al. |
| 5,801,919 A | 9/1998 | Griencewic |
| 5,808,350 A | 9/1998 | Jack et al. |
| 5,832,312 A | 11/1998 | Rieger et al. |
| 5,833,507 A | 11/1998 | Woodgate et al. |
| 5,880,691 A | 3/1999 | Fossum et al. |
| 5,911,008 A | 6/1999 | Niikura et al. |
| 5,933,190 A | 8/1999 | Dierickx et al. |
| 5,963,664 A | 10/1999 | Kumar et al. |
| 5,973,844 A | 10/1999 | Burger |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,095,989 A | 8/2000 | Hay et al. |
| 6,097,394 A | 8/2000 | Levoy et al. |
| 6,124,974 A | 9/2000 | Burger |
| 6,130,786 A | 10/2000 | Osawa et al. |
| 6,137,100 A | 10/2000 | Fossum et al. |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu et al. |
| 6,175,379 B1 | 1/2001 | Uomori et al. |
| 6,205,241 B1 | 3/2001 | Melen |
| 6,239,909 B1 | 5/2001 | Hayashi et al. |
| 6,292,713 B1 | 9/2001 | Jouppi et al. |
| 6,340,994 B1 | 1/2002 | Margulis et al. |
| 6,358,862 B1 | 3/2002 | Ireland et al. |
| 6,419,638 B1 | 7/2002 | Hay et al. |
| 6,443,579 B1 | 9/2002 | Myers |
| 6,476,805 B1 | 11/2002 | Shum et al. |
| 6,477,260 B1 | 11/2002 | Shimomura |
| 6,502,097 B1 | 12/2002 | Chan et al. |
| 6,525,302 B2 | 2/2003 | Dowski, Jr. et al. |
| 6,552,742 B1 | 4/2003 | Seta |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu |
| 6,627,896 B1 | 9/2003 | Hashimoto et al. |
| 6,628,330 B1 | 9/2003 | Lin |
| 6,635,941 B2 | 10/2003 | Suda |
| 6,639,596 B1 | 10/2003 | Shum et al. |
| 6,647,142 B1 | 11/2003 | Beardsley |
| 6,657,218 B2 | 12/2003 | Noda |
| 6,671,399 B1 | 12/2003 | Berestov |
| 6,674,892 B1 | 1/2004 | Melen |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,788,338 B1 | 9/2004 | Dinev |
| 6,795,253 B2 | 9/2004 | Shinohara |
| 6,801,653 B1 | 10/2004 | Wu et al. |
| 6,819,328 B1 | 11/2004 | Moriwaki et al. |
| 6,819,358 B1 | 11/2004 | Kagle et al. |
| 6,879,735 B1 | 4/2005 | Portniaguine et al. |
| 6,897,454 B2 | 5/2005 | Sasaki et al. |
| 6,903,770 B1 | 6/2005 | Kobayashi et al. |
| 6,909,121 B2 | 6/2005 | Nishikawa |
| 6,917,702 B2 | 7/2005 | Beardsley |
| 6,927,922 B2 | 8/2005 | George et al. |
| 6,958,862 B1 * | 10/2005 | Joseph ............... G02B 27/1013 257/294 |
| 6,985,175 B2 | 1/2006 | Iwai et al. |
| 7,015,954 B1 | 3/2006 | Foote et al. |
| 7,085,409 B2 | 8/2006 | Sawhney |
| 7,161,614 B1 | 1/2007 | Yamashita et al. |
| 7,199,348 B2 | 4/2007 | Olsen et al. |
| 7,206,449 B2 | 4/2007 | Raskar et al. |
| 7,215,364 B2 | 5/2007 | Wachtel et al. |
| 7,235,785 B2 | 6/2007 | Hornback et al. |
| 7,245,761 B2 | 7/2007 | Grossberg et al. |
| 7,262,799 B2 | 8/2007 | Suda |
| 7,292,735 B2 | 11/2007 | Blake et al. |
| 7,295,697 B1 | 11/2007 | Satoh |
| 7,333,651 B1 | 2/2008 | Kim et al. |
| 7,369,165 B2 | 5/2008 | Bosco et al. |
| 7,391,572 B2 | 6/2008 | Jacobowitz et al. |
| 7,408,725 B2 | 8/2008 | Sato |
| 7,425,984 B2 | 9/2008 | Chen |
| 7,430,312 B2 | 9/2008 | Gu |
| 7,471,765 B2 | 12/2008 | Jaffray et al. |
| 7,496,293 B2 | 2/2009 | Shamir et al. |
| 7,564,019 B2 | 7/2009 | Olsen |
| 7,599,547 B2 | 10/2009 | Sun et al. |
| 7,606,484 B1 | 10/2009 | Richards et al. |
| 7,620,265 B1 | 11/2009 | Wolff |
| 7,633,511 B2 | 12/2009 | Shum et al. |
| 7,639,435 B2 | 12/2009 | Chiang et al. |
| 7,646,549 B2 | 1/2010 | Zalevsky et al. |
| 7,657,090 B2 | 2/2010 | Omatsu et al. |
| 7,667,824 B1 | 2/2010 | Moran |
| 7,675,080 B2 | 3/2010 | Boettiger |
| 7,675,681 B2 | 3/2010 | Tomikawa et al. |
| 7,706,634 B2 | 4/2010 | Schmitt et al. |

(56) References Cited

U.S. PATENT DOCUMENTS

| | | |
|---|---|---|
| 7,723,662 B2 | 5/2010 | Levoy et al. |
| 7,738,013 B2 | 6/2010 | Galambos et al. |
| 7,741,620 B2 | 6/2010 | Doering et al. |
| 7,782,364 B2 | 8/2010 | Smith |
| 7,826,153 B2 | 11/2010 | Hong |
| 7,840,067 B2 | 11/2010 | Shen et al. |
| 7,912,673 B2 | 3/2011 | Hébert et al. |
| 7,924,321 B2 | 4/2011 | Mitsunaga et al. |
| 7,956,871 B2 | 6/2011 | Fainstain et al. |
| 7,965,314 B1 | 6/2011 | Miller et al. |
| 7,973,834 B2 | 7/2011 | Yang |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,055,466 B2 | 11/2011 | Bryll |
| 8,077,245 B2 | 12/2011 | Adamo et al. |
| 8,089,515 B2 | 1/2012 | Chebil et al. |
| 8,098,297 B2 | 1/2012 | Crisan et al. |
| 8,098,304 B2 | 1/2012 | Pinto et al. |
| 8,106,949 B2 | 1/2012 | Tan et al. |
| 8,111,910 B2 | 2/2012 | Tanaka |
| 8,126,279 B2 | 2/2012 | Marcellin et al. |
| 8,130,120 B2 | 3/2012 | Kawabata et al. |
| 8,131,097 B2 | 3/2012 | Lelescu et al. |
| 8,149,323 B2 | 4/2012 | Li |
| 8,164,629 B1 | 4/2012 | Zhang |
| 8,169,486 B2 | 5/2012 | Corcoran et al. |
| 8,180,145 B2 | 5/2012 | Wu et al. |
| 8,189,065 B2 | 5/2012 | Georgiev et al. |
| 8,189,089 B1 | 5/2012 | Georgiev |
| 8,194,296 B2 | 6/2012 | Compton |
| 8,212,914 B2 | 7/2012 | Chiu |
| 8,213,711 B2 | 7/2012 | Tam |
| 8,231,814 B2 | 7/2012 | Duparre |
| 8,242,426 B2 | 8/2012 | Ward et al. |
| 8,244,027 B2 | 8/2012 | Takahashi |
| 8,244,058 B1 | 8/2012 | Intwala et al. |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,284,240 B2 | 10/2012 | Saint-Pierre et al. |
| 8,289,409 B2 | 10/2012 | Chang |
| 8,289,440 B2 | 10/2012 | Pitts et al. |
| 8,290,358 B1 | 10/2012 | Georgiev |
| 8,294,099 B2 | 10/2012 | Blackwell, Jr. |
| 8,294,754 B2 | 10/2012 | Jung et al. |
| 8,300,085 B2 | 10/2012 | Yang et al. |
| 8,305,456 B1 | 11/2012 | McMahon |
| 8,315,476 B1 | 11/2012 | Georgiev et al. |
| 8,345,144 B1 | 1/2013 | Georgiev et al. |
| 8,360,574 B2 | 1/2013 | Ishak et al. |
| 8,400,555 B1 | 3/2013 | Georgiev |
| 8,406,562 B2 | 3/2013 | Bassi et al. |
| 8,411,146 B2 | 4/2013 | Twede |
| 8,446,492 B2 | 5/2013 | Nakano et al. |
| 8,456,517 B2 | 6/2013 | Mor et al. |
| 8,493,496 B2 | 7/2013 | Freedman et al. |
| 8,514,291 B2 | 8/2013 | Chang |
| 8,514,491 B2 | 8/2013 | Duparre |
| 8,541,730 B2 | 9/2013 | Inuiya |
| 8,542,933 B2 | 9/2013 | Venkataraman |
| 8,553,093 B2 | 10/2013 | Wong et al. |
| 8,559,756 B2 | 10/2013 | Georgiev et al. |
| 8,565,547 B2 | 10/2013 | Strandemar |
| 8,576,302 B2 | 11/2013 | Yoshikawa |
| 8,577,183 B2 | 11/2013 | Robinson |
| 8,581,995 B2 | 11/2013 | Lin et al. |
| 8,619,082 B1 | 12/2013 | Ciurea et al. |
| 8,648,918 B2 | 2/2014 | Kauker et al. |
| 8,655,052 B2 | 2/2014 | Spooner et al. |
| 8,682,107 B2 | 3/2014 | Yoon et al. |
| 8,687,087 B2 | 4/2014 | Pertsel et al. |
| 8,692,893 B2 | 4/2014 | McMahon |
| 8,754,941 B1 | 6/2014 | Sarwari et al. |
| 8,773,536 B1 | 7/2014 | Zhang |
| 8,780,113 B1 | 7/2014 | Ciurea et al. |
| 8,804,255 B2 | 8/2014 | Duparre |
| 8,830,375 B2 | 9/2014 | Ludwig |
| 8,831,367 B2 | 9/2014 | Venkataraman |
| 8,831,377 B2 | 9/2014 | Pitts et al. |
| 8,836,793 B1 | 9/2014 | Kriesel et al. |
| 8,842,201 B2 | 9/2014 | Tajiri |
| 8,854,462 B2 | 10/2014 | Herbin et al. |
| 8,861,089 B2 | 10/2014 | Duparre |
| 8,866,912 B2 | 10/2014 | Mullis |
| 8,866,920 B2 | 10/2014 | Venkataraman et al. |
| 8,866,951 B2 | 10/2014 | Keelan |
| 8,878,950 B2 | 11/2014 | Lelescu et al. |
| 8,885,059 B1 | 11/2014 | Venkataraman et al. |
| 8,885,922 B2 | 11/2014 | Ito et al. |
| 8,896,594 B2 | 11/2014 | Xiong et al. |
| 8,896,719 B1 | 11/2014 | Venkataraman et al. |
| 8,902,321 B2 | 12/2014 | Venkataraman et al. |
| 8,928,793 B2 | 1/2015 | McMahon |
| 8,977,038 B2 | 3/2015 | Tian et al. |
| 9,001,226 B1 | 4/2015 | Ng et al. |
| 9,019,426 B2 | 4/2015 | Han et al. |
| 9,025,894 B2 | 5/2015 | Venkataraman |
| 9,025,895 B2 | 5/2015 | Venkataraman |
| 9,030,528 B2 | 5/2015 | Pesach et al. |
| 9,031,335 B2 | 5/2015 | Venkataraman |
| 9,031,342 B2 | 5/2015 | Venkataraman |
| 9,031,343 B2 | 5/2015 | Venkataraman |
| 9,036,928 B2 | 5/2015 | Venkataraman |
| 9,036,931 B2 | 5/2015 | Venkataraman et al. |
| 9,041,823 B2 | 5/2015 | Venkataraman et al. |
| 9,041,824 B2 | 5/2015 | Lelescu et al. |
| 9,041,829 B2 | 5/2015 | Venkataraman et al. |
| 9,042,667 B2 | 5/2015 | Venkataraman et al. |
| 9,047,684 B2 | 6/2015 | Lelescu et al. |
| 9,049,367 B2 | 6/2015 | Venkataraman et al. |
| 9,055,233 B2 | 6/2015 | Venkataraman et al. |
| 9,060,120 B2 | 6/2015 | Venkataraman et al. |
| 9,060,124 B2 | 6/2015 | Venkataraman et al. |
| 9,077,893 B2 | 7/2015 | Venkataraman et al. |
| 9,094,661 B2 | 7/2015 | Venkataraman et al. |
| 9,100,586 B2 | 8/2015 | McMahon et al. |
| 9,100,635 B2 | 8/2015 | Duparre et al. |
| 9,123,117 B2 | 9/2015 | Ciurea et al. |
| 9,123,118 B2 | 9/2015 | Ciurea et al. |
| 9,124,815 B2 | 9/2015 | Venkataraman et al. |
| 9,124,831 B2 | 9/2015 | Mullis |
| 9,124,864 B2 | 9/2015 | Mullis |
| 9,128,228 B2 | 9/2015 | Duparre |
| 9,129,183 B2 | 9/2015 | Venkataraman et al. |
| 9,129,377 B2 | 9/2015 | Ciurea et al. |
| 9,143,711 B2 | 9/2015 | McMahon |
| 9,147,254 B2 | 9/2015 | Florian et al. |
| 9,185,276 B2 | 11/2015 | Rodda et al. |
| 9,188,765 B2 | 11/2015 | Venkataraman et al. |
| 9,191,580 B2 | 11/2015 | Venkataraman et al. |
| 9,197,821 B2 | 11/2015 | McMahon |
| 9,210,392 B2 | 12/2015 | Nisenzon et al. |
| 9,214,013 B2 | 12/2015 | Venkataraman et al. |
| 9,235,898 B2 | 1/2016 | Venkataraman et al. |
| 9,235,900 B2 | 1/2016 | Ciurea et al. |
| 9,240,049 B2 | 1/2016 | Ciurea et al. |
| 9,253,380 B2 | 2/2016 | Venkataraman et al. |
| 9,256,974 B1 | 2/2016 | Hines |
| 9,264,592 B2 | 2/2016 | Rodda et al. |
| 9,264,610 B2 | 2/2016 | Duparre |
| 9,361,662 B2 | 6/2016 | Lelescu et al. |
| 9,374,512 B2 | 6/2016 | Venkataraman et al. |
| 9,412,206 B2 | 8/2016 | McMahon et al. |
| 9,413,953 B2 | 8/2016 | Maeda |
| 9,426,343 B2 | 8/2016 | Rodda et al. |
| 9,426,361 B2 | 8/2016 | Venkataraman et al. |
| 9,438,888 B2 | 9/2016 | Venkataraman et al. |
| 9,445,003 B1 | 9/2016 | Lelescu et al. |
| 9,456,134 B2 | 9/2016 | Venkataraman et al. |
| 9,456,196 B2 | 9/2016 | Kim et al. |

(56) References Cited

U.S. PATENT DOCUMENTS

| | | |
|---|---|---|
| 9,462,164 B2 | 10/2016 | Venkataraman et al. |
| 9,485,496 B2 | 11/2016 | Venkataraman et al. |
| 9,497,370 B2 | 11/2016 | Venkataraman et al. |
| 9,497,429 B2 | 11/2016 | Mullis et al. |
| 9,516,222 B2 | 12/2016 | Duparre et al. |
| 9,519,972 B2 | 12/2016 | Venkataraman et al. |
| 9,521,319 B2 | 12/2016 | Rodda et al. |
| 9,521,416 B1 | 12/2016 | McMahon et al. |
| 9,536,166 B2 | 1/2017 | Venkataraman et al. |
| 9,576,369 B2 | 2/2017 | Venkataraman et al. |
| 9,578,237 B2 | 2/2017 | Duparre et al. |
| 9,578,259 B2 | 2/2017 | Molina |
| 9,602,805 B2 | 3/2017 | Venkataraman et al. |
| 9,633,442 B2 | 4/2017 | Venkataraman et al. |
| 9,635,274 B2 | 4/2017 | Lin et al. |
| 9,638,883 B1 | 5/2017 | Duparre |
| 9,661,310 B2 | 5/2017 | Deng et al. |
| 9,706,132 B2 | 7/2017 | Nisenzon et al. |
| 9,712,759 B2 | 7/2017 | Venkataraman et al. |
| 9,733,486 B2 | 8/2017 | Lelescu et al. |
| 9,741,118 B2 | 8/2017 | Mullis |
| 9,743,051 B2 | 8/2017 | Venkataraman et al. |
| 9,749,547 B2 | 8/2017 | Venkataraman et al. |
| 9,749,568 B2 | 8/2017 | McMahon |
| 9,754,422 B2 | 9/2017 | McMahon et al. |
| 9,766,380 B2 | 9/2017 | Duparre et al. |
| 9,769,365 B1 | 9/2017 | Jannard |
| 9,774,789 B2 | 9/2017 | Ciurea et al. |
| 9,774,831 B2 | 9/2017 | Venkataraman et al. |
| 9,787,911 B2 | 10/2017 | McMahon et al. |
| 9,794,476 B2 | 10/2017 | Nayar et al. |
| 9,800,856 B2 | 10/2017 | Venkataraman et al. |
| 9,800,859 B2 | 10/2017 | Venkataraman et al. |
| 9,807,382 B2 | 10/2017 | Duparre et al. |
| 9,811,753 B2 | 11/2017 | Venkataraman et al. |
| 9,813,616 B2 | 11/2017 | Lelescu et al. |
| 9,813,617 B2 | 11/2017 | Venkataraman et al. |
| 9,858,673 B2 | 1/2018 | Ciurea et al. |
| 9,864,921 B2 | 1/2018 | Venkataraman et al. |
| 9,888,194 B2 | 2/2018 | Duparre |
| 9,898,856 B2 | 2/2018 | Yang et al. |
| 9,917,998 B2 | 3/2018 | Venkataraman et al. |
| 9,924,092 B2 | 3/2018 | Rodda et al. |
| 9,955,070 B2 | 4/2018 | Lelescu et al. |
| 9,986,224 B2 | 5/2018 | Mullis |
| 2001/0005225 A1 | 6/2001 | Clark et al. |
| 2001/0019621 A1 | 9/2001 | Hanna et al. |
| 2001/0028038 A1 | 10/2001 | Hamaguchi et al. |
| 2001/0038387 A1 | 11/2001 | Tomooka et al. |
| 2002/0012056 A1 | 1/2002 | Trevino |
| 2002/0015536 A1 | 2/2002 | Warren |
| 2002/0027608 A1 | 3/2002 | Johnson |
| 2002/0028014 A1 | 3/2002 | Ono et al. |
| 2002/0039438 A1 | 4/2002 | Mori et al. |
| 2002/0057845 A1 | 5/2002 | Fossum |
| 2002/0061131 A1* | 5/2002 | Sawhney ............... G06T 15/205 382/154 |
| 2002/0063807 A1 | 5/2002 | Margulis |
| 2002/0075450 A1 | 6/2002 | Aratani |
| 2002/0087403 A1 | 7/2002 | Meyers et al. |
| 2002/0089596 A1 | 7/2002 | Yasuo |
| 2002/0094027 A1 | 7/2002 | Sato et al. |
| 2002/0101528 A1 | 8/2002 | Lee |
| 2002/0113867 A1 | 8/2002 | Takigawa et al. |
| 2002/0113888 A1 | 8/2002 | Sonoda et al. |
| 2002/0120634 A1 | 8/2002 | Min et al. |
| 2002/0122113 A1 | 9/2002 | Foote et al. |
| 2002/0163054 A1 | 11/2002 | Suda et al. |
| 2002/0167537 A1 | 11/2002 | Trajkovic |
| 2002/0177054 A1 | 11/2002 | Saitoh et al. |
| 2002/0190991 A1 | 12/2002 | Efran et al. |
| 2002/0195548 A1 | 12/2002 | Dowski, Jr. et al. |
| 2003/0025227 A1 | 2/2003 | Daniell |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0156189 A1 | 8/2003 | Utsumi et al. |
| 2003/0179418 A1 | 9/2003 | Wengender et al. |
| 2003/0188659 A1 | 10/2003 | Merry et al. |
| 2003/0190072 A1 | 10/2003 | Adkins et al. |
| 2003/0198377 A1 | 10/2003 | Ng et al. |
| 2003/0211405 A1* | 11/2003 | Venkataraman ............... H01L 27/14621 430/7 |
| 2004/0003409 A1 | 1/2004 | Berstis et al. |
| 2004/0008271 A1 | 1/2004 | Hagimori et al. |
| 2004/0012689 A1 | 1/2004 | Tinnerino |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0071367 A1 | 4/2004 | Irani et al. |
| 2004/0075654 A1 | 4/2004 | Hsiao et al. |
| 2004/0096119 A1 | 5/2004 | Williams |
| 2004/0100570 A1 | 5/2004 | Shizukuishi |
| 2004/0105021 A1 | 6/2004 | Hu et al. |
| 2004/0114807 A1 | 6/2004 | Lelescu et al. |
| 2004/0141659 A1 | 7/2004 | Zhang |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179008 A1 | 9/2004 | Gordon et al. |
| 2004/0179834 A1 | 9/2004 | Szajewski |
| 2004/0196379 A1 | 10/2004 | Chen et al. |
| 2004/0207600 A1 | 10/2004 | Zhang et al. |
| 2004/0207836 A1 | 10/2004 | Chhibber et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0239782 A1 | 12/2004 | Equitz et al. |
| 2004/0239885 A1 | 12/2004 | Jaynes et al. |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou et al. |
| 2005/0009313 A1 | 1/2005 | Suzuki et al. |
| 2005/0010621 A1 | 1/2005 | Pinto et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0083531 A1 | 4/2005 | Millerd et al. |
| 2005/0084179 A1 | 4/2005 | Hanna et al. |
| 2005/0128509 A1 | 6/2005 | Tokkonen et al. |
| 2005/0128595 A1 | 6/2005 | Shimizu |
| 2005/0132098 A1 | 6/2005 | Sonoda et al. |
| 2005/0134698 A1 | 6/2005 | Schroeder |
| 2005/0134699 A1 | 6/2005 | Nagashima |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0168924 A1 | 8/2005 | Wu et al. |
| 2005/0175257 A1 | 8/2005 | Kuroki |
| 2005/0185711 A1 | 8/2005 | Pfister et al. |
| 2005/0205785 A1 | 9/2005 | Hornback et al. |
| 2005/0219264 A1 | 10/2005 | Shum et al. |
| 2005/0219363 A1 | 10/2005 | Kohler |
| 2005/0224843 A1 | 10/2005 | Boemler |
| 2005/0225654 A1 | 10/2005 | Feldman et al. |
| 2005/0265633 A1 | 12/2005 | Piacentino et al. |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0007331 A1 | 1/2006 | Izumi et al. |
| 2006/0018509 A1 | 1/2006 | Miyoshi |
| 2006/0023197 A1 | 2/2006 | Joel |
| 2006/0023314 A1 | 2/2006 | Boettiger et al. |

(56) References Cited

U.S. PATENT DOCUMENTS

| | | |
|---|---|---|
| 2006/0028476 A1 | 2/2006 | Sobel et al. |
| 2006/0029270 A1 | 2/2006 | Berestov et al. |
| 2006/0029271 A1 | 2/2006 | Miyoshi et al. |
| 2006/0033005 A1 | 2/2006 | Jerdev et al. |
| 2006/0034003 A1 | 2/2006 | Zalevsky |
| 2006/0034531 A1 | 2/2006 | Poon et al. |
| 2006/0035415 A1 | 2/2006 | Wood |
| 2006/0038891 A1 | 2/2006 | Okutomi et al. |
| 2006/0039611 A1 | 2/2006 | Rother |
| 2006/0046204 A1 | 3/2006 | Ono et al. |
| 2006/0049930 A1 | 3/2006 | Zruya et al. |
| 2006/0050980 A1 | 3/2006 | Kohashi et al. |
| 2006/0054780 A1 | 3/2006 | Garrood et al. |
| 2006/0054782 A1 | 3/2006 | Olsen |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0103754 A1 | 5/2006 | Wenstrand et al. |
| 2006/0125936 A1 | 6/2006 | Gruhike et al. |
| 2006/0138322 A1 | 6/2006 | Costello et al. |
| 2006/0152803 A1 | 7/2006 | Provitola |
| 2006/0157640 A1 | 7/2006 | Perlman et al. |
| 2006/0159369 A1* | 7/2006 | Young .................. G06T 3/4069 382/299 |
| 2006/0176566 A1 | 8/2006 | Boettiger et al. |
| 2006/0187338 A1 | 8/2006 | May et al. |
| 2006/0197937 A1 | 9/2006 | Bamji et al. |
| 2006/0203100 A1 | 9/2006 | Ajito et al. |
| 2006/0203113 A1 | 9/2006 | Wada et al. |
| 2006/0210146 A1 | 9/2006 | Gu |
| 2006/0210186 A1 | 9/2006 | Berkner |
| 2006/0214085 A1 | 9/2006 | Olsen |
| 2006/0221250 A1 | 10/2006 | Rossbach et al. |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2006/0289772 A1 | 12/2006 | Johnson et al. |
| 2007/0002159 A1 | 1/2007 | Olsen |
| 2007/0008575 A1 | 1/2007 | Yu et al. |
| 2007/0009150 A1 | 1/2007 | Suwa |
| 2007/0024614 A1 | 2/2007 | Tam |
| 2007/0030356 A1 | 2/2007 | Yea et al. |
| 2007/0035707 A1 | 2/2007 | Margulis |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0092245 A1 | 4/2007 | Bazakos et al. |
| 2007/0102622 A1 | 5/2007 | Olsen et al. |
| 2007/0126898 A1* | 6/2007 | Feldman .................. G02B 9/12 348/294 |
| 2007/0127831 A1 | 6/2007 | Venkataraman |
| 2007/0139333 A1 | 6/2007 | Sato et al. |
| 2007/0140685 A1 | 6/2007 | Wu |
| 2007/0146503 A1 | 6/2007 | Shiraki |
| 2007/0146511 A1 | 6/2007 | Kinoshita et al. |
| 2007/0153335 A1 | 7/2007 | Hosaka |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0171290 A1 | 7/2007 | Kroger |
| 2007/0177004 A1 | 8/2007 | Kolehmainen et al. |
| 2007/0182843 A1 | 8/2007 | Shimamura et al. |
| 2007/0201859 A1 | 8/2007 | Sarrat et al. |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0225600 A1 | 9/2007 | Weibrecht et al. |
| 2007/0228256 A1 | 10/2007 | Mentzer |
| 2007/0236595 A1 | 10/2007 | Pan et al. |
| 2007/0242141 A1 | 10/2007 | Ciurea |
| 2007/0247517 A1 | 10/2007 | Zhang et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263113 A1 | 11/2007 | Baek et al. |
| 2007/0263114 A1 | 11/2007 | Gurevich et al. |
| 2007/0268374 A1 | 11/2007 | Robinson |
| 2007/0296721 A1 | 12/2007 | Chang et al. |
| 2007/0296832 A1 | 12/2007 | Ota et al. |
| 2007/0296835 A1 | 12/2007 | Olsen |
| 2007/0296847 A1 | 12/2007 | Chang et al. |
| 2007/0297696 A1 | 12/2007 | Hamza |
| 2008/0006859 A1 | 1/2008 | Mionetto et al. |
| 2008/0019611 A1 | 1/2008 | Larkin |
| 2008/0024683 A1 | 1/2008 | Damera-Venkata et al. |
| 2008/0025649 A1 | 1/2008 | Liu et al. |
| 2008/0030592 A1 | 2/2008 | Border et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0054518 A1 | 3/2008 | Ra et al. |
| 2008/0056302 A1 | 3/2008 | Erdal et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0099804 A1 | 5/2008 | Venezia et al. |
| 2008/0106620 A1 | 5/2008 | Sawachi et al. |
| 2008/0112059 A1 | 5/2008 | Choi et al. |
| 2008/0112635 A1 | 5/2008 | Kondo et al. |
| 2008/0117289 A1 | 5/2008 | Schowengerdt et al. |
| 2008/0118241 A1 | 5/2008 | Tekolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152215 A1 | 6/2008 | Horie et al. |
| 2008/0152296 A1 | 6/2008 | Oh et al. |
| 2008/0156991 A1 | 7/2008 | Hu et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0165257 A1 | 7/2008 | Boettiger et al. |
| 2008/0174670 A1 | 7/2008 | Olsen et al. |
| 2008/0187305 A1 | 8/2008 | Raskar et al. |
| 2008/0193026 A1 | 8/2008 | Horie et al. |
| 2008/0211737 A1 | 9/2008 | Kim et al. |
| 2008/0218610 A1 | 9/2008 | Chapman et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0278610 A1 | 11/2008 | Boettiger et al. |
| 2008/0284880 A1 | 11/2008 | Numata |
| 2008/0291295 A1 | 11/2008 | Kato et al. |
| 2008/0298674 A1 | 12/2008 | Baker et al. |
| 2008/0310501 A1 | 12/2008 | Ward et al. |
| 2009/0027543 A1 | 1/2009 | Kanehiro et al. |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0079862 A1* | 3/2009 | Subbotin ............ H04N 5/23212 348/345 |
| 2009/0086074 A1 | 4/2009 | Li et al. |
| 2009/0091645 A1 | 4/2009 | Trimeche et al. |
| 2009/0091806 A1 | 4/2009 | Inuiya |

(56) References Cited

U.S. PATENT DOCUMENTS

| | | | |
|---|---|---|---|
| 2009/0092363 A1 | 4/2009 | Daum et al. | |
| 2009/0096050 A1 | 4/2009 | Park | |
| 2009/0102956 A1 | 4/2009 | Georgiev | |
| 2009/0103792 A1* | 4/2009 | Rahn | G01N 21/4795 382/131 |
| 2009/0109306 A1 | 4/2009 | Shan | |
| 2009/0127430 A1 | 5/2009 | Hirasawa et al. | |
| 2009/0128644 A1 | 5/2009 | Camp et al. | |
| 2009/0128833 A1 | 5/2009 | Yahav | |
| 2009/0129667 A1 | 5/2009 | Ho et al. | |
| 2009/0140131 A1 | 6/2009 | Utagawa et al. | |
| 2009/0141933 A1 | 6/2009 | Wagg | |
| 2009/0147919 A1 | 6/2009 | Goto et al. | |
| 2009/0152664 A1 | 6/2009 | Klem et al. | |
| 2009/0167922 A1 | 7/2009 | Perlman et al. | |
| 2009/0167934 A1 | 7/2009 | Gupta | |
| 2009/0179142 A1 | 7/2009 | Duparre et al. | |
| 2009/0180021 A1 | 7/2009 | Kikuchi et al. | |
| 2009/0200622 A1 | 8/2009 | Tai et al. | |
| 2009/0201371 A1 | 8/2009 | Matsuda et al. | |
| 2009/0207235 A1 | 8/2009 | Francini et al. | |
| 2009/0219435 A1 | 9/2009 | Yuan et al. | |
| 2009/0225203 A1 | 9/2009 | Tanida et al. | |
| 2009/0237520 A1 | 9/2009 | Kaneko et al. | |
| 2009/0245573 A1 | 10/2009 | Saptharishi et al. | |
| 2009/0256947 A1 | 10/2009 | Ciurea et al. | |
| 2009/0263017 A1 | 10/2009 | Tanbakuchi | |
| 2009/0268192 A1 | 10/2009 | Koenck et al. | |
| 2009/0268970 A1 | 10/2009 | Babacan et al. | |
| 2009/0268983 A1 | 10/2009 | Stone | |
| 2009/0274387 A1 | 11/2009 | Jin | |
| 2009/0279800 A1 | 11/2009 | Uetani et al. | |
| 2009/0284651 A1 | 11/2009 | Srinivasan | |
| 2009/0290811 A1 | 11/2009 | Imai | |
| 2009/0297056 A1 | 12/2009 | Lelescu et al. | |
| 2009/0302205 A9 | 12/2009 | Olsen et al. | |
| 2009/0317061 A1 | 12/2009 | Jung et al. | |
| 2009/0322876 A1 | 12/2009 | Lee et al. | |
| 2009/0323195 A1 | 12/2009 | Hembree et al. | |
| 2009/0323206 A1 | 12/2009 | Oliver et al. | |
| 2009/0324118 A1 | 12/2009 | Maslov et al. | |
| 2010/0002126 A1 | 1/2010 | Wenstrand et al. | |
| 2010/0002313 A1 | 1/2010 | Duparre et al. | |
| 2010/0002314 A1 | 1/2010 | Duparre | |
| 2010/0007714 A1 | 1/2010 | Kim et al. | |
| 2010/0013927 A1 | 1/2010 | Nixon | |
| 2010/0044815 A1 | 2/2010 | Chang et al. | |
| 2010/0045809 A1 | 2/2010 | Packard | |
| 2010/0053342 A1 | 3/2010 | Hwang et al. | |
| 2010/0053600 A1 | 3/2010 | Tanida | |
| 2010/0060746 A9 | 3/2010 | Olsen et al. | |
| 2010/0073463 A1 | 3/2010 | Momonoi et al. | |
| 2010/0074532 A1 | 3/2010 | Gordon et al. | |
| 2010/0085425 A1 | 4/2010 | Tan | |
| 2010/0086227 A1 | 4/2010 | Sun et al. | |
| 2010/0091389 A1 | 4/2010 | Henriksen et al. | |
| 2010/0097491 A1 | 4/2010 | Farina et al. | |
| 2010/0103175 A1 | 4/2010 | Okutomi et al. | |
| 2010/0103259 A1 | 4/2010 | Tanida et al. | |
| 2010/0103308 A1 | 4/2010 | Butterfield et al. | |
| 2010/0111444 A1 | 5/2010 | Coffman | |
| 2010/0118127 A1 | 5/2010 | Nam et al. | |
| 2010/0128145 A1 | 5/2010 | Pitts et al. | |
| 2010/0129048 A1* | 5/2010 | Pitts | H04N 5/23212 386/278 |
| 2010/0133230 A1 | 6/2010 | Henriksen et al. | |
| 2010/0133418 A1 | 6/2010 | Sargent et al. | |
| 2010/0141802 A1* | 6/2010 | Knight | H04N 5/23212 348/240.3 |
| 2010/0142828 A1 | 6/2010 | Chang et al. | |
| 2010/0142839 A1 | 6/2010 | Lakus-Becker | |
| 2010/0157073 A1 | 6/2010 | Kondo et al. | |
| 2010/0165152 A1 | 7/2010 | Lim | |
| 2010/0166410 A1 | 7/2010 | Chang et al. | |
| 2010/0171866 A1 | 7/2010 | Brady et al. | |
| 2010/0177411 A1 | 7/2010 | Hegde et al. | |
| 2010/0182406 A1 | 7/2010 | Benitez et al. | |
| 2010/0194860 A1 | 8/2010 | Mentz et al. | |
| 2010/0194901 A1 | 8/2010 | van Hoorebeke et al. | |
| 2010/0195716 A1 | 8/2010 | Gunnewiek et al. | |
| 2010/0201809 A1 | 8/2010 | Oyama et al. | |
| 2010/0201834 A1 | 8/2010 | Maruyama et al. | |
| 2010/0202054 A1 | 8/2010 | Niederer | |
| 2010/0202683 A1 | 8/2010 | Robinson | |
| 2010/0208100 A9 | 8/2010 | Olsen et al. | |
| 2010/0220212 A1 | 9/2010 | Perlman et al. | |
| 2010/0223237 A1 | 9/2010 | Mishra et al. | |
| 2010/0225740 A1 | 9/2010 | Jung et al. | |
| 2010/0231285 A1 | 9/2010 | Boomer et al. | |
| 2010/0238327 A1 | 9/2010 | Griffith et al. | |
| 2010/0244165 A1 | 9/2010 | Lake et al. | |
| 2010/0245684 A1 | 9/2010 | Xiao et al. | |
| 2010/0254627 A1 | 10/2010 | Panahpour Tehrani et al. | |
| 2010/0259610 A1 | 10/2010 | Petersen et al. | |
| 2010/0265346 A1 | 10/2010 | Iizuka | |
| 2010/0265381 A1 | 10/2010 | Yamamoto et al. | |
| 2010/0265385 A1 | 10/2010 | Knight et al. | |
| 2010/0281070 A1 | 11/2010 | Chan et al. | |
| 2010/0289941 A1 | 11/2010 | Ito et al. | |
| 2010/0290483 A1 | 11/2010 | Park et al. | |
| 2010/0302423 A1 | 12/2010 | Adams, Jr. et al. | |
| 2010/0309292 A1 | 12/2010 | Ho et al. | |
| 2010/0309368 A1 | 12/2010 | Choi et al. | |
| 2010/0321595 A1 | 12/2010 | Chiu et al. | |
| 2010/0321640 A1 | 12/2010 | Yeh et al. | |
| 2010/0329556 A1 | 12/2010 | Mitarai et al. | |
| 2011/0001037 A1 | 1/2011 | Tewinkle | |
| 2011/0018973 A1 | 1/2011 | Takayama | |
| 2011/0019048 A1 | 1/2011 | Raynor et al. | |
| 2011/0019243 A1 | 1/2011 | Constant, Jr. et al. | |
| 2011/0031381 A1 | 2/2011 | Tay et al. | |
| 2011/0032370 A1 | 2/2011 | Ludwig | |
| 2011/0033129 A1 | 2/2011 | Robinson | |
| 2011/0038536 A1 | 2/2011 | Gong | |
| 2011/0043661 A1 | 2/2011 | Podoleanu | |
| 2011/0043665 A1 | 2/2011 | Ogasahara | |
| 2011/0043668 A1 | 2/2011 | McKinnon et al. | |
| 2011/0044502 A1 | 2/2011 | Liu et al. | |
| 2011/0051255 A1 | 3/2011 | Lee et al. | |
| 2011/0055729 A1 | 3/2011 | Mason et al. | |
| 2011/0064327 A1 | 3/2011 | Dagher et al. | |
| 2011/0069189 A1 | 3/2011 | Venkataraman et al. | |
| 2011/0080487 A1* | 4/2011 | Venkataraman | H04N 5/2253 348/218.1 |
| 2011/0085028 A1 | 4/2011 | Samadani et al. | |
| 2011/0090217 A1 | 4/2011 | Mashitani et al. | |
| 2011/0108708 A1 | 5/2011 | Olsen et al. | |
| 2011/0115886 A1 | 5/2011 | Nguyen | |
| 2011/0121421 A1 | 5/2011 | Charbon | |
| 2011/0122308 A1 | 5/2011 | Duparre | |
| 2011/0128393 A1 | 6/2011 | Tavi et al. | |
| 2011/0128412 A1 | 6/2011 | Milnes et al. | |
| 2011/0129165 A1 | 6/2011 | Lim et al. | |
| 2011/0141309 A1 | 6/2011 | Nagashima et al. | |
| 2011/0142138 A1 | 6/2011 | Tian et al. | |
| 2011/0149408 A1 | 6/2011 | Hahgholt et al. | |
| 2011/0149409 A1 | 6/2011 | Haugholt et al. | |
| 2011/0153248 A1 | 6/2011 | Gu et al. | |
| 2011/0157321 A1 | 6/2011 | Nakajima et al. | |
| 2011/0157451 A1 | 6/2011 | Chang | |
| 2011/0169994 A1 | 7/2011 | DiFrancesco et al. | |
| 2011/0176020 A1 | 7/2011 | Chang | |
| 2011/0181797 A1 | 7/2011 | Galstian et al. | |
| 2011/0193944 A1 | 8/2011 | Lian et al. | |
| 2011/0199458 A1* | 8/2011 | Hayasaka | H04N 13/232 348/43 |
| 2011/0200319 A1 | 8/2011 | Kravitz et al. | |
| 2011/0206291 A1 | 8/2011 | Kashani et al. | |
| 2011/0207074 A1 | 8/2011 | Hall-Holt et al. | |
| 2011/0211077 A1 | 9/2011 | Nayar et al. | |
| 2011/0211824 A1 | 9/2011 | Georgiev et al. | |
| 2011/0221599 A1 | 9/2011 | Högasten | |
| 2011/0221658 A1 | 9/2011 | Haddick et al. | |
| 2011/0221939 A1 | 9/2011 | Jerdev | |

(56) References Cited

U.S. PATENT DOCUMENTS

| | | |
|---|---|---|
| 2011/0221950 A1 | 9/2011 | Oostra |
| 2011/0222757 A1 | 9/2011 | Yeatman, Jr. et al. |
| 2011/0228142 A1 | 9/2011 | Brueckner |
| 2011/0228144 A1 | 9/2011 | Tian et al. |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0243428 A1 | 10/2011 | Das Gupta et al. |
| 2011/0255592 A1 | 10/2011 | Sung |
| 2011/0255745 A1 | 10/2011 | Hodder et al. |
| 2011/0261993 A1 | 10/2011 | Weiming et al. |
| 2011/0267264 A1 | 11/2011 | McCarthy et al. |
| 2011/0267348 A1 | 11/2011 | Lin |
| 2011/0273531 A1 | 11/2011 | Ito et al. |
| 2011/0274175 A1 | 11/2011 | Sumitomo |
| 2011/0274366 A1 | 11/2011 | Tardif |
| 2011/0279705 A1 | 11/2011 | Kuang et al. |
| 2011/0279721 A1 | 11/2011 | McMahon |
| 2011/0285701 A1 | 11/2011 | Chen et al. |
| 2011/0285866 A1 | 11/2011 | Bhrugumalla et al. |
| 2011/0285910 A1 | 11/2011 | Bamji et al. |
| 2011/0292216 A1 | 12/2011 | Fergus et al. |
| 2011/0298898 A1 | 12/2011 | Jung et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0316968 A1 | 12/2011 | Taguchi et al. |
| 2011/0317766 A1 | 12/2011 | Lim, II et al. |
| 2012/0012748 A1 | 1/2012 | Pain et al. |
| 2012/0014456 A1 | 1/2012 | Martinez Bauza et al. |
| 2012/0019530 A1 | 1/2012 | Baker |
| 2012/0019700 A1 | 1/2012 | Gaber |
| 2012/0023456 A1 | 1/2012 | Sun et al. |
| 2012/0026297 A1 | 2/2012 | Sato |
| 2012/0026342 A1 | 2/2012 | Yu et al. |
| 2012/0026366 A1 | 2/2012 | Golan et al. |
| 2012/0026451 A1 | 2/2012 | Nystrom |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0051624 A1 | 3/2012 | Ando |
| 2012/0056982 A1 | 3/2012 | Katz et al. |
| 2012/0057040 A1 | 3/2012 | Park et al. |
| 2012/0062697 A1 | 3/2012 | Treado et al. |
| 2012/0062702 A1 | 3/2012 | Jiang et al. |
| 2012/0062756 A1 | 3/2012 | Tian |
| 2012/0069235 A1 | 3/2012 | Imai |
| 2012/0081519 A1 | 4/2012 | Goma |
| 2012/0086803 A1 | 4/2012 | Malzbender et al. |
| 2012/0105590 A1 | 5/2012 | Fukumoto et al. |
| 2012/0105691 A1 | 5/2012 | Waqas et al. |
| 2012/0113232 A1 | 5/2012 | Joblove |
| 2012/0113318 A1 | 5/2012 | Galstian et al. |
| 2012/0113413 A1 | 5/2012 | Miahczylowicz-Wolski |
| 2012/0114224 A1 | 5/2012 | Xu et al. |
| 2012/0127275 A1 | 5/2012 | Von Zitzewitz et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0155830 A1 | 6/2012 | Sasaki et al. |
| 2012/0163672 A1 | 6/2012 | McKinnon |
| 2012/0169433 A1 | 7/2012 | Mullins et al. |
| 2012/0170134 A1 | 7/2012 | Bolis et al. |
| 2012/0176479 A1 | 7/2012 | Mayhew et al. |
| 2012/0176481 A1 | 7/2012 | Lukk et al. |
| 2012/0188235 A1 | 7/2012 | Wu et al. |
| 2012/0188341 A1 | 7/2012 | Klein Gunnewiek et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200669 A1 | 8/2012 | Lai |
| 2012/0200726 A1 | 8/2012 | Bugnariu |
| 2012/0200734 A1 | 8/2012 | Tang |
| 2012/0206582 A1 | 8/2012 | DiCarlo et al. |
| 2012/0219236 A1 | 8/2012 | Ali et al. |
| 2012/0224083 A1 | 9/2012 | Jovanovski et al. |
| 2012/0229602 A1 | 9/2012 | Chen et al. |
| 2012/0229628 A1 | 9/2012 | Ishiyama et al. |
| 2012/0237114 A1 | 9/2012 | Park et al. |
| 2012/0249550 A1 | 10/2012 | Akeley et al. |
| 2012/0249750 A1 | 10/2012 | Izzat et al. |
| 2012/0249836 A1 | 10/2012 | Ali et al. |
| 2012/0249853 A1 | 10/2012 | Krolczyk et al. |
| 2012/0262601 A1 | 10/2012 | Choi et al. |
| 2012/0262607 A1 | 10/2012 | Shimura et al. |
| 2012/0268574 A1 | 10/2012 | Gidon et al. |
| 2012/0274626 A1 | 11/2012 | Hsieh |
| 2012/0287291 A1 | 11/2012 | McMahon et al. |
| 2012/0290257 A1 | 11/2012 | Hodge et al. |
| 2012/0293489 A1 | 11/2012 | Chen et al. |
| 2012/0293624 A1 | 11/2012 | Chen et al. |
| 2012/0293695 A1 | 11/2012 | Tanaka |
| 2012/0307093 A1 | 12/2012 | Miyoshi |
| 2012/0307099 A1 | 12/2012 | Yahata et al. |
| 2012/0314033 A1 | 12/2012 | Lee et al. |
| 2012/0314937 A1 | 12/2012 | Kim et al. |
| 2012/0327222 A1 | 12/2012 | Ng et al. |
| 2013/0002828 A1 | 1/2013 | Ding et al. |
| 2013/0003184 A1 | 1/2013 | Duparre |
| 2013/0010073 A1 | 1/2013 | Do |
| 2013/0016245 A1 | 1/2013 | Yuba |
| 2013/0016885 A1 | 1/2013 | Tsujimoto et al. |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0038696 A1 | 2/2013 | Ding et al. |
| 2013/0047396 A1 | 2/2013 | Au et al. |
| 2013/0050504 A1 | 2/2013 | Safaee-Rad et al. |
| 2013/0050526 A1 | 2/2013 | Keelan |
| 2013/0057710 A1 | 3/2013 | McMahon |
| 2013/0070060 A1 | 3/2013 | Chatterjee |
| 2013/0076967 A1 | 3/2013 | Brunner et al. |
| 2013/0077859 A1 | 3/2013 | Stauder et al. |
| 2013/0077880 A1 | 3/2013 | Venkataraman et al. |
| 2013/0077882 A1 | 3/2013 | Venkataraman et al. |
| 2013/0083172 A1 | 4/2013 | Baba |
| 2013/0088489 A1 | 4/2013 | Schmeitz et al. |
| 2013/0088637 A1 | 4/2013 | Duparre |
| 2013/0093842 A1 | 4/2013 | Yahata |
| 2013/0107061 A1 | 5/2013 | Kumar et al. |
| 2013/0113888 A1 | 5/2013 | Koguchi |
| 2013/0113899 A1 | 5/2013 | Morohoshi et al. |
| 2013/0113939 A1 | 5/2013 | Strandemar |
| 2013/0120536 A1 | 5/2013 | Song et al. |
| 2013/0120605 A1 | 5/2013 | Georgiev et al. |
| 2013/0121559 A1 | 5/2013 | Hu |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0135315 A1 | 5/2013 | Bares |
| 2013/0147979 A1 | 6/2013 | McMahon et al. |
| 2013/0155050 A1* | 6/2013 | Rastogi ............... G06T 5/50 345/419 |
| 2013/0162641 A1* | 6/2013 | Zhang ............... H04N 13/128 345/419 |
| 2013/0169754 A1* | 7/2013 | Aronsson ........... H04N 5/23212 348/46 |
| 2013/0176394 A1 | 7/2013 | Tian et al. |
| 2013/0208138 A1 | 8/2013 | Li |
| 2013/0215108 A1 | 8/2013 | McMahon et al. |
| 2013/0215231 A1 | 8/2013 | Hiramoto et al. |
| 2013/0222556 A1 | 8/2013 | Shimada |
| 2013/0223759 A1 | 8/2013 | Nishiyama et al. |
| 2013/0229540 A1 | 9/2013 | Farina et al. |
| 2013/0230237 A1 | 9/2013 | Schlosser et al. |
| 2013/0250123 A1 | 9/2013 | Zhang et al. |
| 2013/0250150 A1 | 9/2013 | Malone |
| 2013/0258067 A1 | 10/2013 | Zhang et al. |

(56) References Cited

U.S. PATENT DOCUMENTS

| | | |
|---|---|---|
| 2013/0259317 A1 | 10/2013 | Gaddy |
| 2013/0265459 A1 | 10/2013 | Duparre et al. |
| 2013/0274596 A1 | 10/2013 | Azizian et al. |
| 2013/0274923 A1 | 10/2013 | By et al. |
| 2013/0293760 A1 | 11/2013 | Nisenzon et al. |
| 2013/0335598 A1 | 12/2013 | Gustavsson |
| 2014/0002674 A1 | 1/2014 | Duparre et al. |
| 2014/0002675 A1 | 1/2014 | Duparre et al. |
| 2014/0009586 A1 | 1/2014 | McNamer et al. |
| 2014/0013273 A1 | 1/2014 | Ng et al. |
| 2014/0037137 A1 | 2/2014 | Broaddus et al. |
| 2014/0037140 A1 | 2/2014 | Benhimane et al. |
| 2014/0043507 A1 | 2/2014 | Wang et al. |
| 2014/0076336 A1 | 3/2014 | Clayton et al. |
| 2014/0078333 A1 | 3/2014 | Miao |
| 2014/0079336 A1 | 3/2014 | Venkataraman et al. |
| 2014/0085502 A1 | 3/2014 | Lin et al. |
| 2014/0092281 A1 | 4/2014 | Nisenzon et al. |
| 2014/0098266 A1 | 4/2014 | Nayar et al. |
| 2014/0098267 A1 | 4/2014 | Tian et al. |
| 2014/0104490 A1 | 4/2014 | Hsieh et al. |
| 2014/0118493 A1 | 5/2014 | Sali et al. |
| 2014/0118584 A1 | 5/2014 | Lee et al. |
| 2014/0125771 A1 | 5/2014 | Grossmann et al. |
| 2014/0132810 A1 | 5/2014 | McMahon |
| 2014/0146132 A1 | 5/2014 | Bagnato et al. |
| 2014/0146201 A1 | 5/2014 | Knight et al. |
| 2014/0176592 A1 | 6/2014 | Wilburn et al. |
| 2014/0183334 A1 | 7/2014 | Wang et al. |
| 2014/0186045 A1 | 7/2014 | Poddar et al. |
| 2014/0192154 A1 | 7/2014 | Jeong et al. |
| 2014/0192253 A1 | 7/2014 | Laroia |
| 2014/0198188 A1 | 7/2014 | Izawa |
| 2014/0204183 A1 | 7/2014 | Lee et al. |
| 2014/0218546 A1 | 8/2014 | McMahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267829 A1 | 9/2014 | McMahon et al. |
| 2014/0267890 A1 | 9/2014 | Lelescu et al. |
| 2014/0285675 A1 | 9/2014 | Mullis |
| 2014/0300706 A1 | 10/2014 | Song |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0002734 A1 | 1/2015 | Lee |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0085073 A1 | 3/2015 | Bruls et al. |
| 2015/0085174 A1 | 3/2015 | Shabtay et al. |
| 2015/0091900 A1 | 4/2015 | Yang et al. |
| 2015/0098079 A1 | 4/2015 | Montgomery et al. |
| 2015/0104076 A1 | 4/2015 | Hayasaka |
| 2015/0104101 A1 | 4/2015 | Bryant et al. |
| 2015/0122411 A1 | 5/2015 | Rodda et al. |
| 2015/0124059 A1 | 5/2015 | Georgiev et al. |
| 2015/0124113 A1 | 5/2015 | Rodda et al. |
| 2015/0124151 A1 | 5/2015 | Rodda et al. |
| 2015/0138346 A1 | 5/2015 | Venkataraman et al. |
| 2015/0146029 A1 | 5/2015 | Venkataraman et al. |
| 2015/0146030 A1 | 5/2015 | Venkataraman et al. |
| 2015/0161798 A1 | 6/2015 | Lelescu et al. |
| 2015/0199793 A1 | 7/2015 | Venkataraman et al. |
| 2015/0199841 A1 | 7/2015 | Venkataraman et al. |
| 2015/0243480 A1 | 8/2015 | Yamada et al. |
| 2015/0244927 A1 | 8/2015 | Laroia et al. |
| 2015/0248744 A1 | 9/2015 | Hayasaka et al. |
| 2015/0254868 A1 | 9/2015 | Srikanth et al. |
| 2015/0296137 A1 | 10/2015 | Duparre et al. |
| 2015/0312455 A1 | 10/2015 | Venkataraman et al. |
| 2015/0326852 A1 | 11/2015 | Duparre et al. |
| 2015/0332468 A1 | 11/2015 | Hayasaka et al. |
| 2015/0373261 A1 | 12/2015 | Rodda et al. |
| 2016/0037097 A1 | 2/2016 | Duparre |
| 2016/0044252 A1 | 2/2016 | Molina |
| 2016/0044257 A1 | 2/2016 | Venkataraman et al. |
| 2016/0057332 A1 | 2/2016 | Ciurea et al. |
| 2016/0065934 A1 | 3/2016 | Kaza et al. |
| 2016/0163051 A1 | 6/2016 | Mullis |
| 2016/0165106 A1 | 6/2016 | Duparre |
| 2016/0165134 A1 | 6/2016 | Lelescu et al. |
| 2016/0165147 A1 | 6/2016 | Nisenzon et al. |
| 2016/0165212 A1 | 6/2016 | Mullis |
| 2016/0195733 A1 | 7/2016 | Lelescu et al. |
| 2016/0198096 A1 | 7/2016 | Lelescu et al. |
| 2016/0227195 A1 | 8/2016 | Venkataraman et al. |
| 2016/0249001 A1 | 8/2016 | McMahon |
| 2016/0255333 A1 | 9/2016 | Nisenzon et al. |
| 2016/0266284 A1 | 9/2016 | Duparre et al. |
| 2016/0267665 A1 | 9/2016 | Venkataraman et al. |
| 2016/0267672 A1 | 9/2016 | Ciurea et al. |
| 2016/0269626 A1 | 9/2016 | McMahon |
| 2016/0269627 A1 | 9/2016 | McMahon |
| 2016/0269650 A1 | 9/2016 | Venkataraman et al. |
| 2016/0269651 A1 | 9/2016 | Venkataraman et al. |
| 2016/0269664 A1 | 9/2016 | Duparre |
| 2016/0316140 A1 | 10/2016 | Nayar et al. |
| 2017/0006233 A1 | 1/2017 | Venkataraman et al. |
| 2017/0048468 A1 | 2/2017 | Pain et al. |
| 2017/0053382 A1 | 2/2017 | Lelescu et al. |
| 2017/0054901 A1 | 2/2017 | Venkataraman et al. |
| 2017/0070672 A1 | 3/2017 | Rodda et al. |
| 2017/0070673 A1 | 3/2017 | Lelescu et al. |
| 2017/0078568 A1 | 3/2017 | Venkataraman et al. |
| 2017/0085845 A1 | 3/2017 | Venkataraman et al. |
| 2017/0094243 A1 | 3/2017 | Venkataraman et al. |
| 2017/0099465 A1 | 4/2017 | Mullis et al. |
| 2017/0163862 A1 | 6/2017 | Molina |
| 2017/0178363 A1 | 6/2017 | Venkataraman et al. |
| 2017/0187933 A1 | 6/2017 | Duparre |
| 2017/0244960 A1 | 8/2017 | Ciurea et al. |
| 2017/0257562 A1 | 9/2017 | Venkataraman et al. |
| 2017/0365104 A1 | 12/2017 | McMahon et al. |
| 2018/0007284 A1 | 1/2018 | Venkataraman et al. |

(56) References Cited

U.S. PATENT DOCUMENTS

| | | | |
|---|---|---|---|
| 2018/0013945 | A1 | 1/2018 | Ciurea et al. |
| 2018/0024330 | A1 | 1/2018 | Laroia |
| 2018/0035057 | A1 | 2/2018 | McMahon et al. |
| 2018/0040135 | A1 | 2/2018 | Mullis |
| 2018/0048830 | A1 | 2/2018 | Venkataraman et al. |
| 2018/0097993 | A1 | 4/2018 | Nayar et al. |
| 2018/0109782 | A1 | 4/2018 | Duparre et al. |
| 2018/0124311 | A1 | 5/2018 | Lelescu et al. |
| 2018/0139382 | A1 | 5/2018 | Venkataraman et al. |
| 2018/0211402 | A1 | 7/2018 | Ciurea et al. |

FOREIGN PATENT DOCUMENTS

| | | |
|---|---|---|
| CN | 101010619 A | 8/2007 |
| CN | 101064780 A | 10/2007 |
| CN | 101102388 A | 1/2008 |
| CN | 101147392 A | 3/2008 |
| CN | 101427372 A | 5/2009 |
| CN | 101606086 A | 12/2009 |
| CN | 101883291 A | 11/2010 |
| CN | 102037717 A | 4/2011 |
| CN | 102375199 A | 3/2012 |
| CN | 104081414 A | 10/2014 |
| CN | 104508681 A | 4/2015 |
| CN | 104662589 A | 5/2015 |
| CN | 104685513 A | 6/2015 |
| CN | 104685860 A | 6/2015 |
| CN | 104081414 B | 8/2017 |
| CN | 107230236 A | 10/2017 |
| CN | 107346061 A | 11/2017 |
| EP | 0677821 A2 | 10/1995 |
| EP | 0840502 A2 | 5/1998 |
| EP | 1201407 A2 | 5/2002 |
| EP | 1355274 A2 | 10/2003 |
| EP | 1734766 A2 | 12/2006 |
| EP | 1243945 B1 | 1/2009 |
| EP | 2026563 A1 | 2/2009 |
| EP | 2104334 A1 | 9/2009 |
| EP | 2244484 A1 | 10/2010 |
| EP | 0957642 B1 | 4/2011 |
| EP | 2336816 A2 | 6/2011 |
| EP | 2339532 A1 | 6/2011 |
| EP | 2381418 A1 | 10/2011 |
| EP | 2652678 A1 | 10/2013 |
| EP | 2761534 A1 | 8/2014 |
| EP | 2867718 A1 | 5/2015 |
| EP | 2873028 A1 | 5/2015 |
| EP | 2888698 A2 | 7/2015 |
| EP | 2888720 A1 | 7/2015 |
| EP | 2901671 A2 | 8/2015 |
| EP | 3066690 A1 | 9/2016 |
| EP | 2652678 B1 | 9/2017 |
| EP | 2817955 B1 | 4/2018 |
| EP | 3328048 A1 | 5/2018 |
| GB | 2482022 A | 1/2012 |
| IN | 2708/CHENP/2014 A1 | 8/2015 |
| JP | 59025483 | 2/1984 |
| JP | 64037177 | 2/1989 |
| JP | 02285772 A | 11/1990 |
| JP | 07015457 A | 1/1995 |
| JP | 09181913 A | 7/1997 |
| JP | 11142609 A | 5/1999 |
| JP | 11223708 A | 8/1999 |
| JP | 2000209503 A | 7/2000 |
| JP | 2001008235 A2 | 1/2001 |
| JP | 2001194114 A2 | 7/2001 |
| JP | 2001264033 A2 | 9/2001 |
| JP | 2001277260 A | 10/2001 |
| JP | 2001337263 A2 | 12/2001 |
| JP | 2002195910 A | 7/2002 |
| JP | 2002205310 A | 7/2002 |
| JP | 2002252338 A | 9/2002 |
| JP | 2003094445 A | 4/2003 |
| JP | 2003139910 A | 5/2003 |
| JP | 2003163938 A | 6/2003 |
| JP | 2003298920 A | 10/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2005303694 A | 10/2005 |
| JP | 2005354124 A | 12/2005 |
| JP | 2006033228 A | 2/2006 |
| JP | 2006033493 A | 2/2006 |
| JP | 2006047944 A | 2/2006 |
| JP | 2006258930 A | 9/2006 |
| JP | 2007520107 A | 7/2007 |
| JP | 2007259136 A | 10/2007 |
| JP | 2008039852 A | 2/2008 |
| JP | 2008055908 A | 3/2008 |
| JP | 2008507874 A | 3/2008 |
| JP | 2008258885 A | 10/2008 |
| JP | 2009132010 A | 6/2009 |
| JP | 2009300268 A | 12/2009 |
| JP | 2011017764 A | 1/2011 |
| JP | 2011030184 A | 2/2011 |
| JP | 2011109484 A | 6/2011 |
| JP | 2011523538 A | 8/2011 |
| JP | 2013526801 A | 6/2013 |
| JP | 2014521117 A | 8/2014 |
| JP | 2014535191 A | 12/2014 |
| JP | 2015522178 A | 8/2015 |
| JP | 2015534734 A | 12/2015 |
| JP | 6140709 | 5/2017 |
| JP | 2017163550 A | 9/2017 |
| JP | 2017163587 | 9/2017 |
| JP | 2017531976 A | 10/2017 |
| KR | 20110097647 A | 8/2011 |
| KR | 20170063827 A | 6/2017 |
| KR | 101824672 B1 | 2/2018 |
| SG | 191151 A1 | 7/2013 |
| TW | 200828994 A | 7/2008 |
| TW | 200939739 A | 9/2009 |
| WO | 2005057922 A1 | 6/2005 |
| WO | 2006039906 A2 | 4/2006 |
| WO | 2006039906 A3 | 9/2006 |
| WO | 2007013250 A1 | 2/2007 |
| WO | 2007083579 A1 | 7/2007 |
| WO | 2007134137 A2 | 11/2007 |
| WO | 2008045198 A2 | 4/2008 |
| WO | 2008050904 A1 | 5/2008 |
| WO | 2008108271 A1 | 9/2008 |
| WO | 2008108926 A1 | 9/2008 |
| WO | 2008150817 A1 | 12/2008 |
| WO | 2009073950 A1 | 6/2009 |
| WO | 2009151903 A2 | 12/2009 |
| WO | 2009157273 A1 | 12/2009 |
| WO | 2011008443 A2 | 1/2011 |
| WO | 2011055655 A1 | 5/2011 |
| WO | 2011063347 A2 | 5/2011 |
| WO | 2011105814 A2 | 9/2011 |
| WO | 2011116203 A1 | 9/2011 |
| WO | 2011063347 A3 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2013166215 A1 | 11/2013 |
| WO | 2014004134 A1 | 1/2014 |
| WO | 2014005123 A1 | 1/2014 |

(56) References Cited

FOREIGN PATENT DOCUMENTS

| | | |
|---|---|---|
| WO | 2014031795 A1 | 2/2014 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014149902 A1 | 9/2014 |
| WO | 2014150856 A1 | 9/2014 |
| WO | 2014153098 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |
| WO | 2014133974 A9 | 4/2015 |
| WO | 2015048694 A2 | 4/2015 |
| WO | 2015070105 A1 | 5/2015 |
| WO | 2015074078 A1 | 5/2015 |
| WO | 2015081279 A1 | 6/2015 |
| WO | 2015134996 A1 | 9/2015 |
| WO | 2016054089 A1 | 4/2016 |

OTHER PUBLICATIONS

Scharstein et al., "High-Accuracy Stereo Depth Maps Using Structured Light", IEEE Computer Society Conference on Computer Vision and Pattern Recognition (CVPR 2003), Jun. 2003, vol. 1, pp. 195-202.

Seitz et al., "Plenoptic Image Editing", International Journal of Computer Vision 48, Conference Date Jan. 7, 1998, 29 pgs, DOI: 10.1109/ICCV.1998.710696 • Source: DBLP Conference: Computer Vision, Sixth International Conference.

Shotton et al., "Real-time human pose recognition in parts from single depth images", CVPR 2011, Jun. 20-25, 2011, Colorado Springs, CO, USA, pp. 1297-1304.

Shum et al., "A Review of Image-based Rendering Techniques", Visual Communications and Image Processing 2000, May 2000, 12 pgs.

Shum et al., "Pop-Up Light Field: An Interactive Image-Based Modeling and Rendering System", Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5, 2014.

Silberman et al., "Indoor segmentation and support inference from RGBD images", ECCV'12 Proceedings of the 12th European conference on Computer Vision, vol. Part V, Oct. 7-13, 2012, Florence, Italy, pp. 746-760.

Stober, "Stanford researchers developing 3-D camera with 12,616 lenses", Stanford Report, Mar. 19, 2008, Retrieved from: http://news.stanford.edu/news/2008/march19/camera-031908.html, 5 pgs.

Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.

Sun et al., "Image Super-Resolution Using Gradient Profile Prior", 2008 IEEE Conference on Computer Vision and Pattern Recognition, Jun. 23-28, 2008, 8 pgs.; DOI: 10.1109/CVPR.2008.4587659.

Taguchi et al., "Rendering-Oriented Decoding for a Distributed Multiview Coding System Using a Coset Code", Hindawi Publishing Corporation, EURASIP Journal on Image and Video Processing, vol. 2009, Article ID 251081, Online: Apr. 22, 2009, 12 pages.

Takeda et al., "Super-resolution Without Explicit Subpixel Motion Estimation", IEEE Transaction on Image Processing, Sep. 2009, vol. 18, No. 9, pp. 1958-1975.

Tallon et al., "Upsampling and Denoising of Depth Maps Via Joint-Segmentation", 20th European Signal Processing Conference, Aug. 27-31, 2012, 5 pgs.

Tanida et al., "Color imaging with an integrated compound imaging system", Optics Express, Sep. 8, 2003, vol. 11, No. 18, pp. 2109-2117.

Tanida et al., "Thin observation module by bound optics (TOMBO): concept and experimental verification", Applied Optics, Apr. 10, 2001, vol. 40, No. 11, pp. 1806-1813.

Tao et al., "Depth from Combining Defocus and Correspondence Using Light-Field Cameras", ICCV '13 Proceedings of the 2013 IEEE International Conference on Computer Vision, Dec. 1, 2013, pp. 673-680.

Taylor, "Virtual camera movement: The way of the future?", American Cinematographer, vol. 77, No. 9, Sep. 1996, 93-100.

Tseng et al., "Automatic 3-D depth recovery from a single urban-scene image", 2012 Visual Communications and Image Processing, Nov. 27-30, 2012, San Diego, CA, USA, pp. 1-6.

Vaish et al., "Reconstructing Occluded Surfaces Using Synthetic Apertures: Stereo, Focus and Robust Measures", 2006 IEEE Computer Society Conference on Computer Vision and Pattern Recognition (CVPR'06), vol. 2, Jun. 17-22, 2006, pp. 2331-2338.

Vaish et al., "Synthetic Aperture Focusing Using a Shear-Warp Factorization of the Viewing Transform", IEEE Workshop on A3DISS, CVPR, 2005, 8 pgs.

Vaish et al., "Using Plane + Parallax for Calibrating Dense Camera Arrays", IEEE Conference on Computer Vision and Pattern Recognition (CVPR), 2004, 8 pgs.

Van Der Wal et al., "The Acadia Vision Processor", Proceedings Fifth IEEE International Workshop on Computer Architectures for Machine Perception, Sep. 13, 2000, Padova, Italy, pp. 31-40.

Veilleux, "CCD Gain Lab: The Theory", University of Maryland, College Park—Observational Astronomy (ASTR 310), Oct. 19, 2006, pp. 1-5 (online), [retrieved on May 13, 2014]. Retrieved from the Internet <URL: http://www.astro.umd.edu/~veilleux/ASTR310/fall06/ccd_theory.pdf, 5 pgs.

Venkataraman et al., "PiCam: An Ultra-Thin High Performance Monolithic Camera Array", ACM Transactions on Graphics (TOG), ACM, US, vol. 32, No. 6, 1 Nov. 1, 2013, pp. 1-13.

Vetro et al., "Coding Approaches for End-To-End 3D TV Systems", Mitsubishi Electric Research Laboratories, Inc., TR2004-137, Dec. 2004, 6 pgs.

Viola et al., "Robust Real-time Object Detection", Cambridge Research Laboratory, Technical Report Series, Compaq, CRL Feb. 2001, Feb. 2001, Printed from: http://www.hpl.hp.com/techreports/Compaq-DEC/CRL-2001-1.pdf, 30 pgs.

Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008.

Wang, "Calculation of Image Position, Size and Orientation Using First Order Properties", Dec. 29, 2010, OPTI521 Tutorial, 10 pgs.

Wang et al., "Automatic Natural Video Matting with Depth", 15th Pacific Conference on Computer Graphics and Applications, PG '07, Oct. 29-Nov. 2, 2007, Maui, HI, USA, pp. 469-472.

Wang et al., "Image and Video Matting: A Survey", Foundations and Trends, Computer Graphics and Vision, vol. 3, No. 2, 2007, pp. 91-175.

Wang et al., "Soft scissors: an interactive tool for realtime high quality matting", ACM Transactions on Graphics (TOG)—Proceedings of ACM SIGGRAPH 2007, vol. 26, Issue 3, Article 9, Jul. 2007, 6 pages, published Aug. 5, 2007.

Wetzstein et al., "Computational Plenoptic Imaging", Computer Graphics Forum, 2011, vol. 30, No. 8, pp. 2397-2426.

Wheeler et al., "Super-Resolution Image Synthesis Using Projections Onto Convex Sets in the Frequency Domain", Proc. SPIE, Mar. 11, 2005, vol. 5674, 12 pgs.

Wieringa et al., "Remote Non-invasive Stereoscopic Imaging of Blood Vessels: First In-vivo Results of a New Multispectral Contrast Enhancement Technology", Annals of Biomedical Engineering, vol. 34, No. 12, Dec. 2006, pp. 1870-1878, Published online Oct. 12, 2006.

(56) References Cited

OTHER PUBLICATIONS

Wikipedia, "Polarizing Filter (Photography)", retrieved from http://en.wikipedia.org/wiki/Polarizing_filter_(photography) on Dec. 12, 2012, last modified on Sep. 26, 2012, 5 pgs.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 1-12.
Wilburn et al., "High-Speed Videography Using a Dense Camera Array", Proceedings of the 2004 IEEE Computer Society Conference on Computer Vision and Pattern Recognition, 2004. CVPR 2004., vol. 2, Jun. 27-Jul. 2, 2004, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C-11.
Wu et al., "A virtual view synthesis algorithm based on image inpainting", 2012 Third International Conference on Networking and Distributed Computing, Hangzhou, China, Oct. 21-24, 2012, pp. 153-156.
Xu, "Real-Time Realistic Rendering and High Dynamic Range Image Display and Compression", Dissertation, School of Computer Science in the College of Engineering and Computer Science at the University of Central Florida, Orlando, Florida, Fall Term 2005, 192 pgs.
Yang et al., "A Real-Time Distributed Light Field Camera", Eurographics Workshop on Rendering (2002), published Jul. 26, 2002, pp. 1-10.
Yang et al., "Superresolution Using Preconditioned Conjugate Gradient Method", Proceedings of SPIE—The International Society for Optical Engineering, Jul. 2002, 8 pgs.
Yokochi et al., "Extrinsic Camera Parameter Estimation Based-on Feature Tracking and GPS Data", 2006, Nara Institute of Science and Technology, Graduate School of Information Science, LNCS 3851, pp. 369-378.
Zhang et al., "A Self-Reconfigurable Camera Array", Eurographics Symposium on Rendering, published Aug. 8, 2004, 12 pgs.
Zhang et al., "Depth estimation, spatially variant image registration, and super-resolution using a multi-lenslet camera", Proceedings of SPIE, vol. 7705, Apr. 23, 2010, pp. 770505-770505-8, XP055113797 ISSN: 0277-786X, DOI: 10.1117/12.852171.
Zheng et al., "Balloon Motion Estimation Using Two Frames", Proceedings of the Asilomar Conference on Signals, Systems and Computers, IEEE, Comp. Soc. Press, US, vol. 2 of 02, Nov. 4, 1991, pp. 1057-1061.
Zhu et al., "Fusion of Time-of-Flight Depth and Stereo for High Accuracy Depth Maps", 2008 IEEE Conference on Computer Vision and Pattern Recognition, Jun. 23-28, 2008, Anchorage, AK, USA, pp. 1-8.
Zomet et al., "Robust Super-Resolution", IEEE, 2001, pp. 1-6.
International Preliminary Report on Patentability for International Application No. PCT/US2013/059991, dated Mar. 17, 2015, dated Mar. 26, 2015, 8 pgs.
International Preliminary Report on Patentability for International Application PCT/US2010/057661, dated May 22, 2012, dated May 31, 2012, 10 pages.
International Preliminary Report on Patentability for International Application PCT/US2011/036349, dated Nov. 13, 2012, dated Nov. 22, 2012, 9 pages.
International Preliminary Report on Patentability for International Application PCT/US2013/056065, dated Feb. 24, 2015, dated Mar. 5, 2015, 4 Pgs.
International Preliminary Report on Patentability for International Application PCT/US2013/024987, dated Aug. 12, 2014, dated Aug. 12, 2014, 13 Pgs.
International Preliminary Report on Patentability for International Application PCT/US2013/027146, completed Aug. 26, 2014, dated Sep. 4, 2014, 10 Pgs.
International Preliminary Report on Patentability for International Application PCT/US2013/039155, completed Nov. 4, 2014, dated Nov. 13, 2014, 10 Pgs.
International Preliminary Report on Patentability for International Application PCT/US2013/046002, dated Dec. 31, 2014, dated Jan. 8, 2015, 6 Pgs.
International Preliminary Report on Patentability for International Application PCT/US2013/048772, dated Dec. 31, 2014, dated Jan. 8, 2015, 8 Pgs.
International Preliminary Report on Patentability for International Application PCT/US2013/056502, dated Feb. 24, 2015, dated Mar. 5, 2015, 7 Pgs.
International Preliminary Report on Patentability for International Application PCT/US2013/069932, dated May 19, 2015, dated May 28, 2015, 12 Pgs.
International Preliminary Report on Patentability for International Application PCT/US2014/017766, dated Aug. 25, 2015, dated Sep. 3, 2015, 8 Pgs.
International Preliminary Report on Patentability for International Application PCT/US2014/018084, dated Aug. 25, 2015, dated Sep. 3, 2015, 11 Pgs.
International Preliminary Report on Patentability for International Application PCT/US2014/021439, dated Sep. 15, 2015, dated Sep. 24, 2015, 9 Pgs.
International Preliminary Report on Patentability for International Application PCT/US2014/022118, dated Sep. 8, 2015, dated Sep. 17, 2015, 4 pgs.
International Preliminary Report on Patentability for International Application PCT/US2014/022123, dated Sep. 8, 2015, dated Sep. 17, 2015, 4 Pgs.
International Preliminary Report on Patentability for International Application PCT/US2014/022774, dated Sep. 22, 2015, dated Oct. 1, 2015, 5 Pgs.
International Preliminary Report on Patentability for International Application PCT/US2014/023762, dated Mar. 2, 2015, dated Mar. 9, 2015, 10 Pgs.
International Preliminary Report on Patentability for International Application PCT/US2014/024407, dated Sep. 15, 2015, dated Sep. 24, 2015, 8 Pgs.
International Preliminary Report on Patentability for International Application PCT/US2014/024903, dated Sep. 15, 2015, dated Sep. 24, 2015, 12 Pgs.
International Preliminary Report on Patentability for International Application PCT/US2014/024947, dated Sep. 15, 2015, dated Sep. 24, 2015, 7 Pgs.
International Preliminary Report on Patentability for International Application PCT/US2014/025100, dated Sep. 15, 2015, dated Sep. 24, 2015, 4 Pgs.
International Preliminary Report on Patentability for International Application PCT/US2014/025904, dated Sep. 15, 2015, dated Sep. 24, 2015, 5 Pgs.
International Preliminary Report on Patentability for International Application PCT/US2014/028447, dated Sep. 15, 2015, dated Sep. 24, 2015, 7 Pgs.
International Preliminary Report on Patentability for International Application PCT/US2014/029052, dated Sep. 15, 2015, dated Sep. 24, 2015, 9 Pgs.
International Preliminary Report on Patentability for International Application PCT/US2014/030692, dated Sep. 15, 2015, dated Sep. 24, 2015, 6 Pgs.
International Preliminary Report on Patentability for International Application PCT/US2014/064693, dated May 10, 2016, dated May 19, 2016, 14 Pgs.
International Preliminary Report on Patentability for International Application PCT/US2014/066229, dated May 24, 2016, dated Jun. 2, 2016, 9 Pgs.
International Preliminary Report on Patentability for International Application PCT/US2014/067740, dated May 31, 2016, dated Jun. 9, 2016, 9 Pgs.

(56) References Cited

OTHER PUBLICATIONS

International Preliminary Report on Patentability for International Application PCT/US2015/019529, dated Sep. 13, 2016, dated Sep. 22, 2016, 9 Pgs.
International Preliminary Report on Patentability for International Application PCT/US2015/053013, dated Apr. 4, 2017, dated Apr. 13, 2017, 9 Pgs.
International Preliminary Report on Patentability for International Application PCT/US2013/062720, dated Mar. 31, 2015, dated Apr. 9, 2015, 8 Pgs.
International Search Report and Written Opinion for International Application PCT/US2013/046002, completed Nov. 13, 2013, dated Nov. 29, 2013, 7 pgs.
International Search Report and Written Opinion for International Application PCT/US2013/056065, Completed Nov. 25, 2013, dated Nov. 26, 2013, 8 pgs.
International Search Report and Written Opinion for International Application PCT/US2013/059991, Completed Feb. 6, 2014, dated Feb. 26, 2014, 8 pgs.
International Search Report and Written Opinion for International Application No. PCT/US2011/064921, Completed Feb. 25, 2011, dated Mar. 6, 2012, 17 pgs.
International Search Report and Written Opinion for International Application No. PCT/US2013/024987, Completed Mar. 27, 2013, dated Apr. 15, 2013, 14 pgs.
International Search Report and Written Opinion for International Application No. PCT/US2013/027146, completed Apr. 2, 2013, dated Apr. 19, 2013, 11 pgs.
International Search Report and Written Opinion for International Application No. PCT/US2013/039155, completed Jul. 1, 2013, dated Jul. 11, 2013, 11 Pgs.
International Search Report and Written Opinion for International Application No. PCT/US2013/048772, Completed Oct. 21, 2013, dated Nov. 8, 2013, 6 pgs.
International Search Report and Written Opinion for International Application No. PCT/US2013/056502, Completed Feb. 18, 2014, dated Mar. 19, 2014, 7 pgs.
International Search Report and Written Opinion for International Application No. PCT/US2013/069932, Completed Mar. 14, 2014, dated Apr. 14, 2014, 12 pgs.
International Search Report and Written Opinion for International Application No. PCT/US2015/019529, completed May 5, 2015, dated Jun. 8, 2015, 11 Pgs.
International Search Report and Written Opinion for International Application No. PCT/US2015/053013, completed Dec. 1, 2015, dated Dec. 30, 2015, 9 Pgs.
International Search Report and Written Opinion for International Application PCT/US2011/036349, completed Aug. 11, 2011, dated Aug. 22, 2011, 11 pgs.
International Search Report and Written Opinion for International Application PCT/US2013/062720, completed Mar. 25, 2014, dated Apr. 21, 2014, 9 Pgs.
International Search Report and Written Opinion for International Application PCT/US2014/017766, completed May 28, 2014, dated Jun. 18, 2014, 9 Pgs.
International Search Report and Written Opinion for International Application PCT/US2014/018084, completed May 23, 2014, dated Jun. 10, 2014, 12 Pgs.
International Search Report and Written Opinion for International Application PCT/US2014/018116, completed May 13, 2014, dated Jun. 2, 2014, 12 Pgs.
International Search Report and Written Opinion for International Application PCT/US2014/021439, completed Jun. 5, 2014, dated Jun. 20, 2014, 10 Pgs.
International Search Report and Written Opinion for International Application PCT/US2014/022118, completed Jun. 9, 2014, dated Jun. 25, 2014, 5 pgs.
International Search Report and Written Opinion for International Application PCT/US2014/022774 report completed Jun. 9, 2014, dated Jul. 14, 2014, 6 Pgs.
International Search Report and Written Opinion for International Application PCT/US2014/024407, report completed Jun. 11, 2014, dated Jul. 8, 2014, 9 Pgs.
International Search Report and Written Opinion for International Application PCT/US2014/025100, report completed Jul. 7, 2014, dated Aug. 7, 2014, 5 Pgs.
International Search Report and Written Opinion for International Application PCT/US2014/025904 report completed Jun. 10, 2014, dated Jul. 10, 2014, 6 Pgs.
Extended European Search Report for EP Application No. 11781313.9, Completed Oct. 1, 2013, dated Oct. 8, 2013, 6 pages.
Extended European Search Report for EP Application No. 13810429.4, Completed Jan. 7, 2016, dated Jan. 15, 2016, 6 Pgs.
Extended European Search Report for European Application EP12782935.6, completed Aug. 28, 2014, dated Sep. 4, 2014, 7 Pgs.
Extended European Search Report for European Application EP12804266.0, Report Completed Jan. 27, 2015, dated Feb. 3, 2015, 6 Pgs.
Extended European Search Report for European Application EP12835041.0, Report Completed Jan. 28, 2015, dated Feb. 4, 2015, 7 Pgs.
Extended European Search Report for European Application EP13751714.0, completed Aug. 5, 2015, dated Aug. 18, 2015, 8 Pgs.
Extended European Search Report for European Application EP13810229.8, Report Completed Apr. 14, 2016, dated Apr. 21, 2016, 7 pgs.
Extended European Search Report for European Application No. 13830945.5, Search completed Jun. 28, 2016, dated Jul. 7, 2016, 14 Pgs.
Extended European Search Report for European Application No. 13841613.6, Search completed Jul. 18, 2016, dated Jul. 26, 2016, 8 Pgs.
Extended European Search Report for European Application No. 14763087.5, Search completed Dec. 7, 2016, dated Dec. 19, 2016, 9 Pgs.
Extended European Search Report for European Application No. 14860103.2, Search completed Feb. 23, 2017, dated Mar. 3, 2017, 7 Pgs.
Extended European Search Report for European Application No. 15847754.7, Search completed Jan. 25, 2018, dated Feb. 9, 2018, 8 Pgs.
Supplementary European Search Report for EP Application No. 13831768.0, Search completed May 18, 2016, dated May 30, 2016, 13 Pgs.
International Preliminary Report on Patentability for International Application No. PCT/US2012/059813, Search Completed Apr. 15, 2014, 7 pgs.
Crabb et al., "Real-time foreground segmentation via range and color imaging", 2008 IEEE Computer Society Conference on Computer Vision and Pattern Recognition Workshops, Anchorage, AK, USA, Jun. 23-28, 2008, pp. 1-5.
Debevec et al., "Recovering High Dynamic Range Radiance Maps from Photographs", Computer Graphics (ACM SIGGRAPH Proceedings), Aug. 16, 1997, 10 pgs.
Do, Minh N. "Immersive Visual Communication with Depth", Presented at Microsoft Research, Jun. 15, 2011, Retrieved from: http://minhdo.ece.illinois.edu/talks/ImmersiveComm.pdf, 42 pgs.
Do et al., "Immersive Visual Communication", IEEE Signal Processing Magazine, vol. 28, Issue 1, Jan. 2011, DOI: 10.1109/MSP.2010.939075, Retrieved from: http://minhdo.ece.illinois.edu/publications/ImmerComm_SPM.pdf, pp. 58-66.
Drouin et al., "Fast Multiple-Baseline Stereo with Occlusion", Fifth International Conference on 3-D Digital Imaging and Modeling (3DIM'05), Ottawa, Ontario, Canada, Jun. 13-16, 2005, pp. 540-547.
Drouin et al., "Geo-Consistency for Wide Multi-Camera Stereo", 2005 IEEE Computer Society Conference on Computer Vision and Pattern Recognition (CVPR'05), vol. 1, Jun. 20-25, 2005, pp. 351-358.
Drouin et al., "Improving Border Localization of Multi-Baseline Stereo Using Border-Cut", International Journal of Computer Vision, Jul. 5, 2006, vol. 83, Issue 3, 8 pgs.

(56) References Cited

OTHER PUBLICATIONS

Duparre et al., "Artificial apposition compound eye fabricated by micro-optics technology", Applied Optics, Aug. 1, 2004, vol. 43, No. 22, pp. 4303-4310.
Duparre et al., "Artificial compound eye zoom camera", Bioinspiration & Biomimetics, Nov. 21, 2008, vol. 3, pp. 1-6.
Duparre et al., "Artificial compound eyes—different concepts and their application to ultra flat image acquisition sensors", MOEMS and Miniaturized Systems IV, Proc. SPIE 5346, Jan. 24, 2004, pp. 89-100.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, Apr. 6, 2006, vol. 1, pp. R1-R16.
Duparre et al., "Microoptical artificial compound eyes—from design to experimental verification of two different concepts", Proc. of SPIE, Optical Design and Engineering II, vol. 5962, Oct. 17, 2005, pp. 59622A-1-59622A-12.
Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.
Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, Apr. 21, 2006, vol. 6196, pp. 619607-1-619607-15.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 2005, vol. 44, No. 15, pp. 2949-2956.
Duparre et al., "Ultra-Thin Camera Based on Artificial Apposition Compound Eyes", 10th Microoptics Conference, Sep. 1-3, 2004, 2 pgs.
Eng, Wei Yong et al., "Gaze correction for 3D tele-immersive communication system", IVMSP Workshop, 2013 IEEE 11th. IEEE, Jun. 10, 2013, 4 pages.
Fanaswala, "Regularized Super-Resolution of Multi-View Images", Retrieved on Nov. 10, 2012 (Nov. 10, 2012). Retrieved from the Internet at URL:<http://www.site.uottawa.ca/-edubois/theses/Fanaswala_thesis.pdf>, 2009, 163 pgs.
Fang et al., "Volume Morphing Methods for Landmark Based 3D Image Deformation", SPIE vol. 2710, Proc. 1996 SPIE Intl Symposium on Medical Imaging, Newport Beach, CA, Feb. 10, 1996, pp. 404-415.
Farrell et al., "Resolution and Light Sensitivity Tradeoff with Pixel Size", Proceedings of the SPIE Electronic Imaging 2006 Conference, Feb. 2, 2006, vol. 6069, 8 pgs.
Farsiu et al., "Advances and Challenges in Super-Resolution", International Journal of Imaging Systems and Technology, Aug. 12, 2004, vol. 14, pp. 47-57.
Farsiu et al., "Fast and Robust Multiframe Super Resolution", IEEE Transactions on Image Processing, Oct. 2004, published Sep. 3, 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, date of publication Dec. 12, 2005, pp. 141-159.
Fecker et al., "Depth Map Compression for Unstructured Lumigraph Rendering", Proc. SPIE 6077, Proceedings Visual Communications and Image Processing 2006, Jan. 18, 2006, pp. 60770B-1-60770B-8.
Feris et al., "Multi-Flash Stereopsis: Depth Edge Preserving Stereo with Small Baseline Illumination", IEEE Trans on PAMI, 2006, 31 pgs.

Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer et al., "Optical System Design", 2nd Edition, SPIE Press, Feb. 14, 2008, pp. 191-198.
Fischer et al., "Optical System Design", 2nd Edition, SPIE Press, Feb. 14, 2008, pp. 49-58.
Gastal et al., "Shared Sampling for Real-Time Alpha Matting", Computer Graphics Forum, Eurographics 2010, vol. 29, Issue 2, May 2010, pp. 575-584.
Georgeiv et al., "Light Field Camera Design for Integral View Photography", Adobe Systems Incorporated, Adobe Technical Report, 2003, 13 pgs.
Georgiev et al., "Light-Field Capture by Multiplexing in the Frequency Domain", Adobe Systems Incorporated, Adobe Technical Report, 2003, 13 pgs.
Goldman et al., "Video Object Annotation, Navigation, and Composition", In Proceedings of UIST 2008, Oct. 19-22, 2008, Monterey CA, USA, pp. 3-12.
Gortler et al., "The Lumigraph", In Proceedings of SIGGRAPH 1996, published Aug. 1, 1996, pp. 43-54.
Gupta et al., "Perceptual Organization and Recognition of Indoor Scenes from RGB-D Images", 2013 IEEE Conference on Computer Vision and Pattern Recognition, Jun. 23-28, 2013, Portland, OR, USA, pp. 564-571.
Hacohen et al., "Non-Rigid Dense Correspondence with Applications for Image Enhancement", ACM Transactions on Graphics, vol. 30, No. 4, Aug. 7, 2011, pp. 70:1-70:10.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, published Nov. 19, 2007, vol. 16, No. 12, pp. 2953-2964.
Hasinoff et al., "Search-and-Replace Editing for Personal Photo Collections", 2010 International Conference: Computational Photography (ICCP) Mar. 2010, pp. 1-8.
Hernandez-Lopez et al., "Detecting objects using color and depth segmentation with Kinect sensor", Procedia Technology, vol. 3, Jan. 1, 2012, pp. 196-204, XP055307680, ISSN: 2212-0173, DOI: 10.1016/j.protcy.2012.03.021.
Holoeye Photonics AG, "Spatial Light Modulators", Oct. 2, 2013, Brochure retrieved from https://web.archive.org/web/20131002061028/http://holoeye.com/wp-content/uploads/Spatial_Light_Modulators.pdf on Oct. 13, 2017, 4 pgs.
Holoeye Photonics AG, "Spatial Light Modulators", Sep. 18, 2013, retrieved from https://web.archive.org/web/20130918113140/http://holoeye.com/spatial-light-modulators/ on Oct. 13, 2017, 4 pages.
Horisaki et al., "Irregular Lens Arrangement Design to Improve Imaging Performance of Compound-Eye Imaging Systems", Applied Physics Express, Jan. 29, 2010, vol. 3, pp. 022501-1-022501-3.
Horisaki et al., "Superposition Imaging for Three-Dimensionally Space-Invariant Point Spread Functions", Applied Physics Express, Oct. 13, 2011, vol. 4, pp. 112501-1-112501-3.
Horn et al., "LightShop: Interactive Light Field Manipulation and Rendering", In Proceedings of I3D, Jan. 1, 2007, pp. 121-128.
Isaksen et al., "Dynamically Reparameterized Light Fields", In Proceedings of SIGGRAPGH 2000, pp. 297-306.
Izadi et al., "KinectFusion: Real-time 3D Reconstruction and Interaction Using a Moving Depth Camera", UIST'11, Oct. 16-19, 2011, Santa Barbara, CA, pp. 559-568.
Janoch et al., "A category-level 3-D object dataset: Putting the Kinect to work", 2011 IEEE International Conference on Computer Vision Workshops (ICCV Workshops), Nov. 6-13, 2011, Barcelona, Spain, pp. 1168-1174.
Jarabo et al., "Efficient Propagation of Light Field Edits", In Proceedings of SIACG 2011, pp. 75-80.
Jiang et al., "Panoramic 3D Reconstruction Using Rotational Stereo Camera with Simple Epipolar Constraints", 2006 IEEE Computer

(56) References Cited

OTHER PUBLICATIONS

Society Conference on Computer Vision and Pattern Recognition (CVPR'06), vol. 1, Jun. 17-22, 2006, New York, NY, USA, pp. 371-378.
Joshi, Neel S. "Color Calibration for Arrays of Inexpensive Image Sensors", Master's with Distinction in Research Report, Stanford University, Department of Computer Science, Mar. 2004, 30 pgs.
Joshi et al., "Synthetic Aperture Tracking: Tracking Through Occlusions", I CCV IEEE 11th International Conference on Computer Vision; Publication [online]. Oct. 2007 [retrieved Jul. 28, 2014]. Retrieved from the Internet: <URL: http:l/ieeexplore.ieee.org/stamp/stamp.jsp?tp=&arnumber=4409032&isnumber=4408819>; pp. 1-8.
Kang et al., "Handling Occlusions in Dense Multi-view Stereo", Computer Vision and Pattern Recognition, 2001, vol. 1, pp. I-103-I-110.
Kim et al., "Scene reconstruction from high spatio-angular resolution light fields", ACM Transactions on Graphics (TOG)—SIGGRAPH 2013 Conference Proceedings, vol. 32, Issue 4, Article 73, Jul. 21, 2013, 11 pages.
Kitamura et al., "Reconstruction of a high-resolution image on a compound-eye image-capturing system", Applied Optics, Mar. 10, 2004, vol. 43, No. 8, pp. 1719-1727.
Konolige, Kurt, "Projected Texture Stereo", 2010 IEEE International Conference on Robotics and Automation, May 3-7, 2010, p. 148-155.
Krishnamurthy et al., "Compression and Transmission of Depth Maps for Image-Based Rendering", Image Processing, 2001, pp. 828-831.
Kubota et al., "Reconstructing Dense Light Field From Array of Multifocus Images for Novel View Synthesis", IEEE Transactions on Image Processing, vol. 16, No. 1, Jan. 2007, pp. 269-279.
Kutulakos et al., "Occluding Contour Detection Using Affine Invariants and Purposive Viewpoint Control", Computer Vision and Pattern Recognition, Proceedings CVPR 94, Seattle, Washington, Jun. 21-23, 1994, 8 pgs.
Lai et al., "A Large-Scale Hierarchical Multi-View RGB-D Object Dataset", Proceedings—IEEE International Conference on Robotics and Automation, Conference Date May 9-13, 2011, 8 pgs., DOI:10.1109/ICRA.201135980382.
Lane et al., "A Survey of Mobile Phone Sensing", IEEE Communications Magazine, vol. 48, Issue 9, Sep. 2010, pp. 140-150.
Lee et al., "Automatic Upright Adjustment of Photographs", IEEE Conference on Computer Vision and Pattern Recognition (CVPR), 2012, pp. 877-884.
Lee et al., "Electroactive Polymer Actuator for Lens-Drive Unit in Auto-Focus Compact Camera Module", ETRI Journal, vol. 31, No. 6, Dec. 2009, pp. 695-702.
Lee et al., "Nonlocal matting", CVPR 2011, Jun. 20-25, 2011, pp. 2193-2200.
LensVector, "How LensVector Autofocus Works", 2010, printed Nov. 2, 2012 from http://www.lensvector.com/overview.html, 1 pg.
Levin et al., "A Closed Form Solution to Natural Image Matting", IEEE Conference on Computer Vision and Pattern Recognition (CVPR), vol. 1, pp. 61-68, (2006).
Levin et al., "Spectral Matting", 2007 IEEE Conference on Computer Vision and Pattern Recognition, Jun. 17-22, 2007, Minneapolis, MN, USA, pp. 1-8.
Levoy, "Light Fields and Computational Imaging", IEEE Computer Society, Sep. 1, 2006, vol. 39, Issue No. 8, pp. 46-55.
Levoy et al., "Light Field Rendering", Proc. ADM SIGGRAPH '96, 1996, pp. 1-12.
Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Li et al., "Fusing Images Wth Different Focuses Using Support Vector Machines", IEEE Transactions on Neural Networks, vol. 15, No. 6, Nov. 8, 2004, pp. 1555-1561.

Lim, Jongwoo, "Optimized Projection Pattern Supplementing Stereo Systems", 2009 IEEE International Conference on Robotics and Automation, May 12-17, 2009, pp. 2823-2829.
Liu et al., "Virtual View Reconstruction Using Temporal Information", 2012 IEEE International Conference on Multimedia and Expo, 2012, pp. 115-120.
Lo et al., "Stereoscopic 3D Copy & Paste", ACM Transactions on Graphics, vol. 29, No. 6, Article 147, Dec. 2010, pp. 147:1-147:10.
Martinez et al., "Simple Telemedicine for Developing Regions: Camera Phones and Paper-Based Microfluidic Devices for Real-Time, Off-Site Diagnosis", Analytical Chemistry (American Chemical Society), vol. 80, No. 10, May 15, 2008, pp. 3699-3707.
McGuire et al., "Defocus video matting", ACM Transactions on Graphics (TOG)—Proceedings of ACM SIGGRAPH 2005, vol. 24, Issue 3, Jul. 2005, pp. 567-576.
Merkle et al., "Adaptation and optimization of coding algorithms for mobile 3DTV", Mobile3DTV Project No. 216503, Nov. 2008, 55 pgs.
Mitra et al., "Light Field Denoising, Light Field Superresolution and Stereo Camera Based Refocussing using a GMM Light Field Patch Prior", Computer Vision and Pattern Recognition Workshops (CVPRW), 2012 IEEE Computer Society Conference on Jun. 16-21, 2012, pp. 22-28.
Moreno-Noguer et al., "Active Refocusing of Images and Videos", ACM Transactions on Graphics (TOG)—Proceedings of ACM SIGGRAPH 2007, vol. 26, Issue 3, Jul. 2007, 10 pages.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 14, 2006, pp. 30-38.
Ng, "Digital Light Field Photography", Thesis, Jul. 2006, 203 pgs.
Ng et al., "Light Field Photography with a Hand-held Plenoptic Camera", Stanford Tech Report CTSR Feb. 2005, Apr. 20, 2005, pp. 1-11.
Ng et al., "Super-Resolution Image Restoration from Blurred Low-Resolution Images", Journal of Mathematical Imaging and Vision, 2005, vol. 23, pp. 367-378.
Nguyen et al., "Error Analysis for Image-Based Rendering with Depth Information", IEEE Transactions on Image Processing, vol. 18, Issue 4, Apr. 2009, pp. 703-716.
Nguyen et al., "Image-Based Rendering with Depth Information Using the Propagation Algorithm", Proceedings. (ICASSP '05). IEEE International Conference on Acoustics, Speech, and Signal Processing, 2005, vol. 5, Mar. 23-23, 2005, pp. II-589-II-592.
Nishihara, H. K., "PRISM: A Practical Real-Time Imaging Stereo Matcher", Massachusetts Institute of Technology, A.I. Memo 780, May 1984, 32 pgs.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, Jun. 2007, 12 pgs.
Park et al., "Multispectral Imaging Using Multiplexed Illumination", 2007 IEEE 11th International Conference on Computer Vision, Oct. 14-21, 2007, Rio de Janeiro, Brazil, pp. 1-8.
Park et al., "Super-Resolution Image Reconstruction", IEEE Signal Processing Magazine, May 2003, pp. 21-36.
Parkkinen et al., "Characteristic Spectra of Munsell Colors", Journal of the Optical Society of America A, vol. 6, Issue 2, Feb. 1989, pp. 318-322.
Perwass et al., "Single Lens 3D-Camera with Extended Depth-of-Field", printed from www.raytrix.de, Jan. 22, 2012, 15 pgs.
Pham et al., "Robust Super-Resolution without Regularization", Journal of Physics: Conference Series 124, Jul. 2008, pp. 1-19.
Philips 3D Solutions, "3D Interface Specifications, White Paper", 2005-2008 Philips Electronics Nederland B.V., Philips 3D Solutions retrieved from www.philips.com/3dsolutions, 29 pgs., Feb. 15, 2008.
Polight, "Designing Imaging Products Using Reflowable Autofocus Lenses", printed Nov. 2, 2012 from http://www.polight.no/tunable-polymer-autofocus-lens-html--11.html, 1 pg.

(56) References Cited

OTHER PUBLICATIONS

Pouydebasque et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.
Protter et al., "Generalizing the Nonlocal-Means to Super-Resolution Reconstruction", IEEE Transactions on Image Processing, Dec. 2, 2008, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rajan et al., "Simultaneous Estimation of Super Resolved Scene and Depth Map from Low Resolution Defocused Observations", IEEE Transactions on Pattern Analysis and Machine Intelligence, vol. 25, No. 9, Sep. 8, 2003, pp. 1-16.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intell, 2013, vol. 35, No. 2, pp. 504-511.
Rhemann et al., "A perceptually motivated online benchmark for image matting", 2009 IEEE Conference on Computer Vision and Pattern Recognition, Jun. 20-25, 2009, Miami, FL, USA, pp. 1826-1833.
Robertson et al., "Dynamic Range Improvement Through Multiple Exposures", In Proc. of the Int. Conf. on Image Processing, 1999, 5 pgs.
Robertson et al., "Estimation—theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2002, pp. 208-215.
International Search Report and Written Opinion for International Application PCT/US2009/044687, completed Jan. 5, 2010, dated Jan. 13, 2010, 9 pgs.
International Search Report and Written Opinion for International Application PCT/US2010/057661, completed Mar. 9, 2011, dated Mar. 17, 2011, 14 pgs.
International Search Report and Written Opinion for International Application PCT/US2012/037670, Completed Jul. 5, 2012, dated Jul. 18, 2012, 9 pgs.
International Search Report and Written Opinion for International Application PCT/US2012/044014, completed Oct. 12, 2012, dated Oct. 26, 2012, 15 pgs.
International Search Report and Written Opinion for International Application PCT/US2012/056151, completed Nov. 14, 2012, dated Nov. 30, 2012, 10 pgs.
International Search Report and Written Opinion for International Application PCT/US2012/058093, completed Nov. 15, 2012, dated Nov. 29, 2012, 12 pgs.
International Search Report and Written Opinion for International Application PCT/US2012/059813, completed Dec. 17, 2012, dated Jan. 7, 2013, 8 pgs.
International Search Report and Written Opinion for International Application PCT/US2014/022123, completed Jun. 9, 2014, dated Jun. 25, 2014, 5 pgs.
International Search Report and Written Opinion for International Application PCT/US2014/023762, Completed May 30, 2014, dated Jul. 3, 2014, 6 Pgs.
International Search Report and Written Opinion for International Application PCT/US2014/024903, completed Jun. 12, 2014, dated Jun. 27, 2014, 13 pgs.
International Search Report and Written Opinion for International Application PCT/US2014/024947, Completed Jul. 8, 2014, dated Aug. 5, 2014, 8 Pgs.
International Search Report and Written Opinion for International Application PCT/US2014/028447, completed Jun. 30, 2014, dated Jul. 21, 2014, 8 Pgs.
International Search Report and Written Opinion for International Application PCT/US2014/029052, completed Jun. 30, 2014, dated Jul. 24, 2014, 10 Pgs.
International Search Report and Written Opinion for International Application PCT/US2014/030692, completed Jul. 28, 2014, dated Aug. 27, 2014, 7 Pgs.
International Search Report and Written Opinion for International Application PCT/US2014/064693, Completed Mar. 7, 2015, dated Apr. 2, 2015, 15 pgs.
International Search Report and Written Opinion for International Application PCT/US2014/066229, Completed Mar. 6, 2015, dated Mar. 19, 2015, 9 Pgs.
International Search Report and Written Opinion for International Application PCT/US2014/067740, Completed Jan. 29, 2015, dated Mar. 3, 2015, 10 pgs.
Office Action for U.S. Appl. No. 12/952,106, dated Aug. 16, 2012, 12 pgs.
"Exchangeable image file format for digital still cameras: Exif Version 2.2", Japan Electronics and Information Technology Industries Association, Prepared by Technical Standardization Committee on AV & IT Storage Systems and Equipment, JEITA CP-3451, Apr. 2002, Retrieved from: http://www.exif.org/Exif2-2.PDF, 154 pgs.
"File Formats Version 6", Alias Systems, 2004, 40 pgs.
"Light fields and computational photography", Stanford Computer Graphics Laboratory, Retrieved from http://graphics.stanford.edu/projects/lightfield/, Earliest publication online: Feb. 10, 1997, 3 pgs.
Aufderheide et al., "A MEMS-based Smart Sensor System for Estimation of Camera Pose for Computer Vision Applications", Research and Innovation Conference 2011, Jul. 29, 2011, pp. 1-10.
Baker et al., "Limits on Super-Resolution and How to Break Them", IEEE Transactions on Pattern Analysis and Machine Intelligence, Sep. 2002, vol. 24, No. 9, pp. 1167-1183.
Barron et al., "Intrinsic Scene Properties from a Single RGB-D Image", 2013 IEEE Conference on Computer Vision and Pattern Recognition, Jun. 23-28, 2013, Portland, OR, USA, pp. 17-24.
Bennett et al., "Multispectral Bilateral Video Fusion", 2007 IEEE Transactions on Image Processing, vol. 16, No. 5, May 2007, published Apr. 16, 2007, pp. 1185-1194.
Bennett et al., "Multispectral Video Fusion", Computer Graphics (ACM SIGGRAPH Proceedings), Jul. 25, 2006, published Jul. 30, 2006, 1 pg.
Bertalmio et al., "Image Inpainting", Proceedings of the 27th Annual Conference on Computer Graphics and Interactive Techniques, 2000, ACM Pres/Addison-Wesley Publishing Co., pp. 417-424.
Bertero et al., "Super-resolution in computational imaging", Micron, Jan. 1, 2003, vol. 34, Issues 6-7, 17 pgs.
Bishop et al., "Full-Resolution Depth Map Estimation from an Aliased Plenoptic Light Field", ACCV Nov. 8, 2010, Part II, LNCS 6493, pp. 186-200.
Bishop et al., "Light Field Superresolution", Computational Photography (ICCP), 2009 IEEE International Conference, Conference Date Apr. 16-17, published Jan. 26, 2009, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, published Aug. 18, 2011, pp. 972-986.
Borman, "Topics in Multiframe Superresolution Restoration", Thesis of Sean Borman, Apr. 2004, 282 pgs.
Borman et al, "Image Sequence Processing", Dekker Encyclopedia of Optical Engineering, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 28, 1998, vol. 3653, 10 pgs.
Borman et al., "Image Resampling and Constraint Formulation for Multi-Frame Super-Resolution Restoration", Proc. SPIE, published Jul. 1, 2003, vol. 5016, 12 pgs.
Borman et al., "Linear models for multi-frame super-resolution restoration under non-affine registration and spatially varying PSF", Proc. SPIE, May 21, 2004, vol. 5299, 12 pgs.
Borman et al., "Nonlinear Prediction Methods for Estimation of Clique Weighting Parameters in NonGaussian Image Models", Proc. SPIE, Sep. 22, 1998, vol. 3459, 9 pgs.

(56) References Cited

OTHER PUBLICATIONS

Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Bose et al., "Superresolution and Noise Filtering Using Moving Least Squares", IEEE Transactions on Image Processing, Aug. 2006, vol. 15, Issue 8, published Jul. 17, 2006, pp. 2239-2248.
Boye et al., "Comparison of Subpixel Image Registration Algorithms", Proc. of SPIE—IS&T Electronic Imaging, Feb. 3, 2009, vol. 7246, pp. 72460X-1-72460X-9; doi: 10.1117/12.810369.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, May 13, 2010, 11 pgs.
Bruckner et al., "Thin wafer-level camera lenses inspired by insect compound eyes", Optics Express, Nov. 22, 2010, vol. 18, No. 24, pp. 24379-24394.
Bryan et al., "Perspective Distortion from Interpersonal Distance Is an Implicit Visual Cue for Social Judgments of Faces", PLOS One, vol. 7, Issue 9, Sep. 26, 2012, e45301, doi:10.1371/journal.pone.0045301, 9 pages.
Capel, "Image Mosaicing and Super-resolution", Retrieved on Nov. 10, 2012, Retrieved from the Internet at URL:<http://citeseerx.ist.psu.edu/viewdoc/download?doi=10.1.1.226.2643&rep=rep1&type=pdf>, 2001, 269 pgs.
Carroll et al., "Image Warps for Artistic Perspective Manipulation", ACM Transactions on Graphics (TOG), vol. 29, No. 4, Jul. 26, 2010, Article No. 127, 9 pgs.
Chan et al., "Extending the Depth of Field in a Compound-Eye Imaging System with Super-Resolution Reconstruction", Proceedings—International Conference on Pattern Recognition, Jan. 1, 2006, vol. 3, pp. 623-626.
Chan et al., "Investigation of Computational Compound-Eye Imaging System with Super-Resolution Reconstruction", IEEE, ISASSP, Jun. 19, 2006, pp. 1177-1180.
Chan et al., "Super-resolution reconstruction in a computational compound-eye imaging system", Multidim Syst Sign Process, published online Feb. 23, 2007, vol. 18, pp. 83-101.
Chen et al., "Image Matting with Local and Nonlocal Smooth Priors", CVPR '13 Proceedings of the 2013 IEEE Conference on Computer Vision and Pattern Recognition, Jun. 23, 2013, pp. 1902-1907.
Chen et al., "Interactive deformation of light fields", In Proceedings of SIGGRAPH I3D, Apr. 3, 2005, pp. 139-146.
Chen et al., "KNN matting", 2012 IEEE Conference on Computer Vision and Pattern Recognition, Jun. 16-21, 2012, Providence, RI, USA, pp. 869-876.
Chen et al., "KNN Matting", IEEE Transactions on Pattern Analysis and Machine Intelligence, Sep. 2013, vol. 35, No. 9, pp. 2175-2188.
Collins et al., "An Active Camera System for Acquiring Multi-View Video", IEEE 2002 International Conference on Image Processing, Date of Conference: Sep. 22-25, 2002, Rochester, NY, 4 pgs.
Cooper et al., "The perceptual basis of common photographic practice", Journal of Vision, vol. 12, No. 5, Article 8, May 25, 2012, pp. 1-14.
Extended European Search Report for European Application No. 18151530.5, Completed Mar. 28, 2018, dated Apr. 20, 2018, 11 pages.
International Preliminary Report on Patentability for International Application No. PCT/US2009/044687, Completed Jul. 30, 2010, 9 pgs.
Supplementary European Search Report for European Application 09763194.9, completed Nov. 7, 2011, dated Nov. 29, 2011, 9 pgs.
Extended European Search Report for European Application No. 14865463.5, Search completed May 30, 2017, dated Jun. 8, 2017, 6 Pgs.
U.S. Appl. No. 61/527,007, filed Aug. 24, 2011, 21 pgs.
International Preliminary Report on Patentability for International Application No. PCT/US2011/064921, Report dated Jun. 18, 2013, dated Jun. 27, 2013, 14 Pgs.
International Preliminary Report on Patentability for International Application No. PCT/US2012/056151, Report dated Mar. 25, 2014, 9 pgs.
International Preliminary Report on Patentability for International Application No. PCT/US2012/056166, Report dated Mar. 25, 2014, Report dated Apr. 3, 2014, 8 pgs.
International Preliminary Report on Patentability for International Application No. PCT/US2012/058093, Report dated Sep. 18, 2013, dated Oct. 22, 2013, 40 pgs.
International Preliminary Report on Patentability for International Application PCT/US2014/018116, dated Sep. 15, 2015, dated Sep. 24, 2015, 12 Pgs.
International Search Report and Written Opinion for International Application No. PCT/US2012/056166, Report Completed Nov. 10, 2012, dated Nov. 20, 2012, 9 pgs.
Drulea et al., "Motion Estimation Using the Correlation Transform", IEEE Transactions on Image Processing, Aug. 2013, vol. 22, No. 8, pp. 3260-3270, first published May 14, 2013.
Holoeye Photonics AG,"LC 2012 Spatial Light Modulator (transmissive)", Sep. 18, 2013, retrieved from https://web.archive.org/web/20130918151716/http://holoeye.com/spatial-light-modulators/lc-2012-spatial-light-modulator/ on Oct. 20, 2017, 3 pages.
Robert et al., "Dense Depth Map Reconstruction : A Minimization and Regularization Approach which Preserves Discontinuities", European Conference on Computer Vision (ECCV), pp. 439-451, 1996.

\* cited by examiner

SYSTEMS AND METHODS FOR MANUFACTURING CAMERA MODULES USING ACTIVE ALIGNMENT OF LENS STACK ARRAYS AND SENSORS

CROSS-REFERENCE TO RELATED APPLICATIONS

The current application is a continuation of U.S. application Ser. No. 10/004,759, filed Jan. 22, 2016, which is a continuation of U.S. application Ser. No. 13/782,920, filed Mar. 1, 2013, which application claims priority to U.S. Provisional Application No. 61/666,852, filed Jun. 30, 2012, the disclosures of which are incorporated herein by reference.

FIELD OF THE INVENTION

The present invention generally relates to actively aligning lens stack arrays with arrays of focal planes.

BACKGROUND

In response to the constraints placed upon a traditional digital camera based upon the camera obscura, a new class of cameras that can be referred to as array cameras has been proposed. Array cameras are characterized in that they include an imager array that has multiple arrays of pixels, where each pixel array is intended to define a focal plane, and each focal plane has a separate lens stack. Typically, each focal plane includes a plurality of rows of pixels that also forms a plurality of columns of pixels, and each focal plane is contained within a region of the imager that does not contain pixels from another focal plane. An image is typically formed on each focal plane by its respective lens stack. In many instances, the array camera is constructed using an imager array that incorporates multiple focal planes and an optic array of lens stacks.

SUMMARY OF THE INVENTION

Systems and methods in accordance with embodiments of the invention actively align a lens stack array with an array of focal planes to construct an array camera module. In one embodiment, a method for actively aligning a lens stack array with a sensor that includes a plurality of focal planes, where each focal plane includes a plurality of rows of pixels that also form a plurality of columns of pixels and each focal plane is contained within a region of the imager array that does not contain pixels from another focal plane, includes: aligning the lens stack array relative to the sensor in an initial position, where the lens stack array includes a plurality of lens stacks and the plurality of lens stacks forms separate optical channels for each focal plane in the sensor; varying the spatial relationship between the lens stack array and the sensor; capturing images of a known target using a plurality of active focal planes at different spatial relationships between the lens stack array and the sensor, where the known target includes at least one region of interest; scoring the images captured by the plurality of active focal planes, where the resulting scores provide a direct comparison of the extent to which at least one region of interest is focused in the images; selecting a spatial relationship between the lens stack array and the sensor based upon a comparison of the scores of images captured by a plurality of the active focal planes; and forming an array camera subassembly in which the lens stack array and the sensor are fixed in the selected spatial relationship.

In another embodiment, scoring the images captured by the plurality of active focal planes includes computing modulation transfer function (MTF) scores for the images.

In yet another embodiment, comparison of the scores of images captured by a plurality of the active focal planes is based upon: a comparison of the scores of the images captured by a plurality of the active focal planes at the selected spatial relationship to the scores of images captured by the same active focal planes at different spatial relationships; and the variation between the scores of the images captured by the active focal planes at the selected spatial relationship.

In still another embodiment, the comparison of scores includes omitting from consideration an image captured by an active focal plane, when the score of the image captured by the active focal plane fails to satisfy at least one predetermined criterion.

In a further embodiment, the at least one predetermined criterion includes the score of the image captured by the active focal plane being within a predetermined range.

In a still further embodiment, the method includes deactivating an active focal plane, when the image captured by the active focal plane is omitted from consideration.

In yet another embodiment, the comparison of scores includes determining a mathematical relationship for each of a plurality of active focal planes that characterizes the relationship between the scores for the images captured by the respective active focal planes and the spatial relationship between the lens stack array and the sensor.

In another embodiment, the comparison of scores further includes computing a best-fit plane using the determined mathematical relationships, where the best-fit plane, defines a desirable spatial relationship in accordance with predetermined criterion.

In yet another embodiment, the predetermined criterion includes maximizing scores while minimizing the variance of the scores.

In still another embodiment: the known target includes a central region of interest and at least one peripheral region of interest; the images are scored such that a score is provided for each region of interest visible in each image, the score being indicative of the extent to which the respective region of interest is focused in the image; the comparison of scores includes determining mathematical relationships for each of a plurality of active focal planes that characterize the relationships between the scores of the extent to which the central region of interest is focused in the images captured by the respective active focal plane and the spatial relationship between the lens stack array and the sensor; and the scores of the extent to which the at least one peripheral region of interest is focused in the images captured by the respective active focal plane and the spatial relationship between the lens stack array and the sensor.

In a further embodiment, the comparison of scores further includes computing, using the determined mathematical relationships: a first best-fit plane that defines a spatial relationship between the lens stack array and the sensor based on each active focal plane's ability to focus on a central region of interest according to predetermined criterion; a second best-fit plane that defines a spatial relationship between the lens stack array and the sensor based on each active focal plane's ability to focus on the at least one peripheral region of interest according to predetermined criterion; and a plurality of planes incrementally spaced that lie between the first and second best-fit planes.

In a still further embodiment, selecting a spatial relationship between the lens stack array and the sensor includes using at least one predetermined criterion to select one of: a spatial relationship defined by the first best-fit plane, a spatial relationship defined by the second best-fit plane, and a spatial relationship defined by one of the plurality of planes.

In a yet still further embodiment, the at least one predetermined criterion is based upon: at each spatial relationship defined by the computed planes, averaging the scores indicative of the extent to which the central region of interest is focused, the scores being averaged across all active focal planes at the respective spatial relationship; at each spatial relationship defined by the computed planes, averaging the scores indicative of the extent to which the at least one peripheral region of interest is focused, the scores being averaged across all active focal planes at the respective spatial relationship; and assessing the variation in the determined average scores between the spatial relationships.

In a further embodiment, aligning the lens stack array relative to the sensor in an initial position further includes: performing an initial sweep of the lens stack array relative to the sensor; capturing an initial set of images of a known target including a central region of interest, at varied spatial relationships along the initial sweep, using a plurality of active focal planes; determining focus scores for the central region of interest in a plurality of the captured images; determining an initial set of mathematical relationships for each of the plurality of active focal planes used to capture the initial set of images, where the mathematical relationships characterize the relationship between the focus scores and the spatial relationship between the lens stack array and the sensor; computing an initial best-fit plane using the initial set of mathematical relationships; and aligning the lens stack array with the computed initial best-fit plane.

In another embodiment, varying the spatial relationship between the lens stack array and the sensor involves sweeping the lens stack array relative to the sensor.

In still another embodiment, the lens stack array is swept in a direction substantially normal to the surface of the sensor.

In a further embodiment, scoring the images captured by the plurality of active focal planes includes: determining preliminary scores for the captured images in accordance with a first criterion; determining scores for a related set of captured images in accordance with a second criterion; and extrapolating the preliminary scores as a function of the spatial relationship between the lens stack array and the sensor based on the scores determined for the related set of captured images.

DETAILED DESCRIPTION

Figure 1:
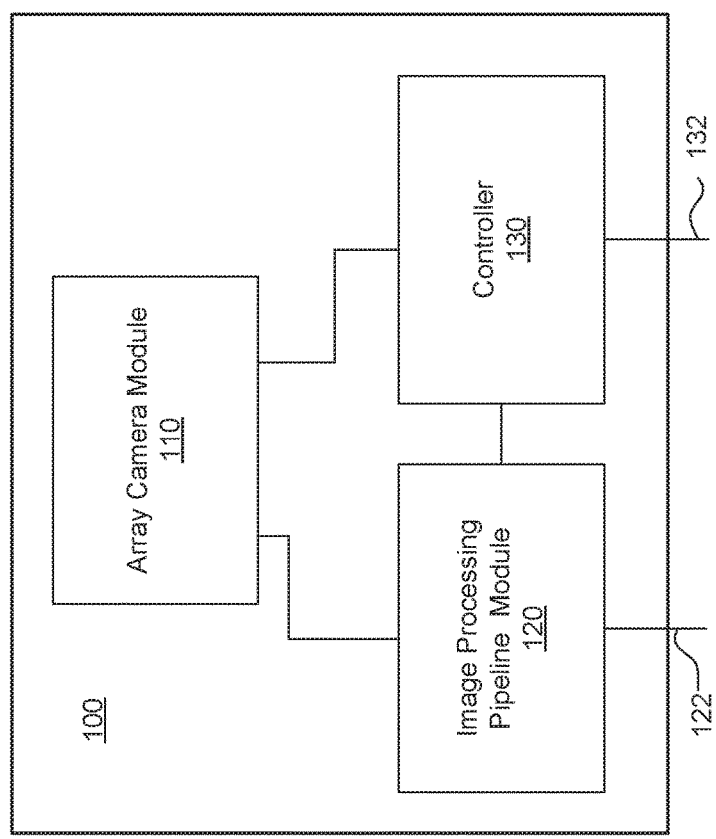
FIG. 1 conceptually illustrates an array camera.

Turning now to the drawings, systems and methods for actively aligning a lens stack array with an array of focal planes on a monolithic sensor in accordance with embodiments of the invention are illustrated. Processes for constructing array cameras using lens stack arrays are described in U.S. patent application Ser. No. 12/935,504, entitled "Capturing and Processing of Images Using Monolithic Camera Array with Heterogeneous Imagers", Venkataraman et al. The disclosure of U.S. patent application Ser. No. 12/935,504 is incorporated by reference herein in its entirety. The monolithic camera modules illustrated in U.S. patent application Ser. No. 12/935,504 can be constructed from a lens stack array and a sensor including a plurality of focal planes corresponding to the optical channels in the lens stack array. The combination of a lens stack and its corresponding focal plane can be understood to be a 'camera module.' Ideally, the lens stack array of an array camera is constructed so that each optical channel has the same focal length. However, the large number of tolerances involved in the manufacture of a lens stack array can result in the different optical channels having varying focal lengths. The combination of all the manufacturing process variations typically results in a deviation of the actual ("first order") lens parameters—such as focal length—from the nominal prescription. As a result, each optical channel can have a different axial optimum image location. And consequently, since the sensor is monolithic, it typically cannot be placed a distance that corresponds with the focal length of each camera within an array camera module. Notably, these manufacturing tolerances may result in different focal lengths even as between lens stack arrays fabricated from the same manufacturing process. Thus, in many embodiments of the invention, a lens stack array is actively aligned with an array of focal planes to form an array camera module that is designed to address the detrimental impact that the variance in focal length within a lens stack array may have.

In the context of the manufacture of camera systems, the term active alignment typically refers to a process for aligning an optical system (e.g. a lens stack array) with an imaging system (e.g. comprising a monolithic sensor) to achieve a final desirable spatial arrangement by evaluating the efficacy of the configuration as a function of the spatial relationship between the optical system and the imaging system. Typically, this process is implemented by using the configuration to capture and record image data (typically of a known target) in real time as the optical system is moving relative to the imaging system. As the optical system is moved relative to the imaging system, the spatial relationship between the two changes, and the characteristics of the recorded image data also change correspondingly. This recorded image data may then be used to align the optical system relative to the imaging system in a desired manner. For example, active alignment can generally be used to determine a spatial relationship that results in a camera module that is capable of recording images that exceed a threshold image quality.

A lens stack array may be actively aligned with an array of focal planes in accordance with embodiments of the invention. Importantly, active alignment in this context can be far more intricate and nuanced than it is in the context of conventional, single-lens, cameras. Foremost, because a lens stack array is typically embodied in a single integral housing, the spatial orientation of an individual lens stack (with respect to its corresponding focal plane) cannot be separately varied from that of the other lens stacks—instead, varying the spatial orientation of one lens stack invariably changes the spatial orientation of the others. Consequently, it may not be possible for multiple cameras to be spatially located at their own respective most desirable positions. As a result, active alignment in the context of array cameras may involve computing a final arrangement that, although does not necessarily place each camera at its own optimal position, sufficiently orients the lens stacks of multiple cameras so that the array camera module as a whole achieves a desirable level of performance.

Additionally, the active alignment of a lens stack array with an array of focal planes typically involves the evaluation of the efficacy of multiple cameras—as opposed to a single camera—at respective varied spatial relationships. In many embodiments, the efficacy of a camera is determined by evaluating the camera's captured and recorded images of a known target at varied spatial relationships. For instance, the Modulation Transfer Function (MTF) score—a numerical score that is indicative of a recorded image's sharpness and thus also focus—may be determined for a given recorded image and used to evaluate a respective camera at a respective spatial orientation. Moreover, the recorded images may be evaluated at different Regions of Interest (ROIs), and in particular at different field heights. For example, an MTF score may be assigned to each ROI within a recorded image. Thus, the corresponding cameras may be evaluated as to each ROI, and this evaluation data may be used to conclude a desirable array camera module configuration.

In several embodiments, only a subset of all of the cameras in an array camera module is used during the evaluation process. The cameras that define this subset may be predetermined, or they may be computationally determined by considering an initial set of image data captured by some or all of the focal planes.

Furthermore, unlike in conventional, single-lens, cameras, the active alignment of an array camera module can involve strategically disabling cameras. For example, if the picture quality of a camera when the array camera module is in an estimated final arrangement is below a specified threshold quality, the camera may be disabled. Thus, in many embodiments of the invention, the active alignment process is initially used to estimate a final arrangement for an array camera module, identify cameras that should be disabled on the basis that they do not achieve a threshold quality and disabling them can improve the overall performance of the other cameras in the camera module, and then compute a final arrangement wherein the disabled cameras are excluded from the computation process. Note that this is possible because an array camera includes a plurality of cameras and is still operable if several of the cameras are deactivated. Namely, the array camera may be configured to rely on the remaining active cameras to function, and synthesize an image based on those remaining active cameras. By allowing the array camera software to deactivate certain cameras, higher manufacturing yields can be achieved that can reduce the cost of the completed camera module.

Array cameras and systems and methods for actively aligning lens stack arrays and sensors to form camera modules for use in array cameras in accordance with embodiments of the invention are discussed further below.

Array Camera Architectures

FIG. 1 illustrates an array camera architecture disclosed in U.S. application Ser. No. 12/935,504. The array camera 100 includes an array camera module 110, which is connected to an image processing pipeline module 120 and to a controller 130. The image processing pipeline module 120 is hardware, firmware, software, or a combination for processing the images received from the array camera module 110. The image processing pipeline module 120 is capable of processing multiple images captured by multiple focal planes in the camera module and can produce a synthesized higher resolution image. In a number of embodiments, the image processing pipeline module 120 provides the synthesized image data via an output 122.

The controller 130 is hardware, software, firmware, or a combination thereof for controlling various operational parameters of the array camera module 110. The controller 130 receives inputs 132 from a user or other external components and sends operation signals to control the array camera module 110. The controller can also send information to the image processing pipeline module 120 to assist processing of the images captured by the focal planes in the array camera module 110.

Although a specific array camera architecture is illustrated in FIG. 1, camera modules constructed using active alignment processes in accordance with embodiments of the invention can be utilized in any of a variety of array camera architectures. Camera modules that can be utilized in array cameras and processes for manufacturing camera modules utilizing active alignment processes in accordance with embodiments of the invention are discussed further below.

Array Camera Modules

Figure 2:
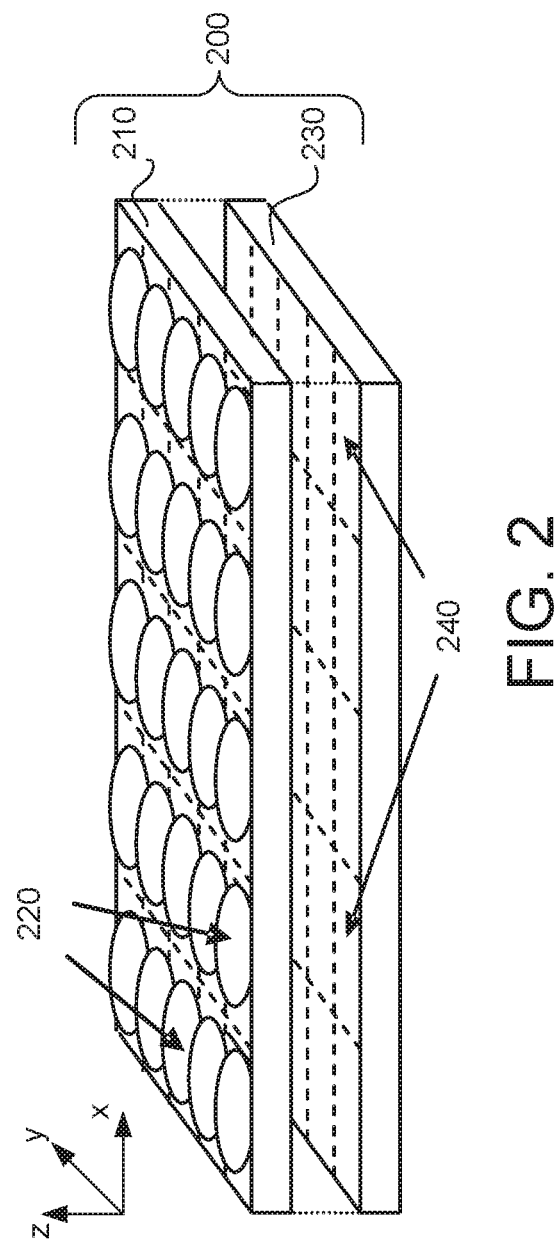
FIG. 2 illustrates an array camera module.
Figure 3:
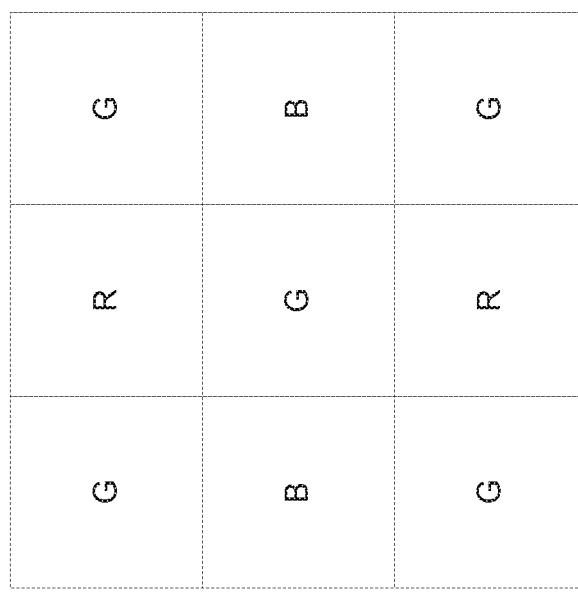
FIG. 3 illustrates an array camera module that employs a π filter.

FIG. 2 illustrates an exploded view of an array camera module formed by combining a lens stack array with a monolithic sensor that includes a corresponding array of focal planes as disclosed in U.S. application Ser. No. 12/935,504. The array camera module 200 includes a lens stack array 210 and a sensor 230 that includes an array of focal planes 240. The lens stack array 210 includes an array of lens stacks 220. Each lens stack creates an optical channel that resolves an image on the focal planes 240 on the sensor. Each of the lens stacks may be of a different type. For example, the optical channels may be used to capture images at different portions of the spectrum and the lens stack in each optical channel may be specifically optimized for the portion of the spectrum imaged by the focal plane associated with the optical channel. More specifically, an array camera module may be patterned with "π filter groups." The term π filter groups refers to a pattern of color filters applied to the lens stack array of a camera module and processes for patterning array cameras with π filter groups are described in U.S. Patent Application Ser. No. 61/641,165 entitled "Camera Modules Patterned with π Filter Groups", Venkataraman et al. The disclosure of U.S. Patent Application Ser. No. 61/641,165 is incorporated by reference herein in its entirety. FIG. 3 illustrates a single π filter group, wherein 5 lenses are configured to receive green light, 2 lenses are configured to receive red light, and 2 lenses are configured to receive blue light. The lens stacks may further have one or multiple separate optical elements axially arranged with respect to each other.

A lens stack array may employ wafer level optics (WLO) technology. WLO is a technology that encompasses a number of processes, including, for example, molding of lens arrays on glass wafers, stacking of those wafers (including wafers having lenses replicated on either side of the substrate) with appropriate spacers, followed by packaging of the optics directly with the imager into a monolithic integrated module.

The WLO procedure may involve, among other procedures, using a diamond-turned mold to create each plastic lens element on a glass substrate. More specifically, the process chain in WLO generally includes producing a diamond turned lens master (both on an individual and array level), then producing a negative mould for replication of that master (also called a stamp or tool), and then finally forming a polymer replica on a glass substrate, which has been structured with appropriate supporting optical elements, such as, for example, apertures (transparent openings in light blocking material layers), and filters.

Although the construction of lens stack arrays using specific WLO processes is discussed above, any of a variety of techniques can be used to construct lens stack arrays, for instance those involving precision glass molding, polymer injection molding or wafer level polymer monolithic lens processes. Issues related to variation in back focal length of the lens stacks within lens stack arrays are discussed below.

Back Focal Plane Alignment

An array camera module is typically intended to be constructed in such a way that each focal plane (i.e. an array of pixels configured to capture an image formed on the focal plane by a corresponding lens stack) is positioned at the focal distance of each lens stack that forms an optical channel. However, manufacturing variations can result in the lens stack in each optical channel varying from its prescription, and in many instances, these variations can result in each lens stack within a lens stack array having a different focal length. For example, parameters that may vary amongst individual lens stacks in a lens stack array because of manufacturing variations include, but are not limited to: the radius of curvature in individual lenses, the conic, higher order aspheric coefficient, refractive index, thickness of the base layer, and/or overall lens height. As one of ordinary skill in the art would appreciate, any number of lens prescriptions may be used to characterize the lens fabrication process, and the respective tolerances may involve departures from these prescriptions in any number of ways, each of which may impact the back focal length. Due to the monolithic nature of the sensor, the spatial relationship of the focal planes (with respect to the lens stacks) cannot be individually customized to accommodate this variability.

Moreover, in many instances, it is the case that a single manufacturing process is used to fabricate a plurality of lens stack arrays. Consequently, in addition to the aforementioned reasons, the back focal lengths may further vary between lens stacks from different lens stack arrays fabricated from the same process. For instance, variability (within tolerance) in the thickness of the lens substrates and spacers employed in the lens stack, especially those toward the sensor cover glass, may further contribute to the variability in the back focal length. Additionally, variability in the (1) thickness of the sensor cover glass, (2) the bond line thickness between the lens spacer and the sensor cover glass, and (3) any air gaps between the sensor and the cover glass, may further exacerbate the variability in the back focal lengths. Thus, even with constant (nominal) process parameters during the lens stack array fabrication and the lens to sensor attachment process, sample to sample variation may result in defocused camera modules.

Figure 4:
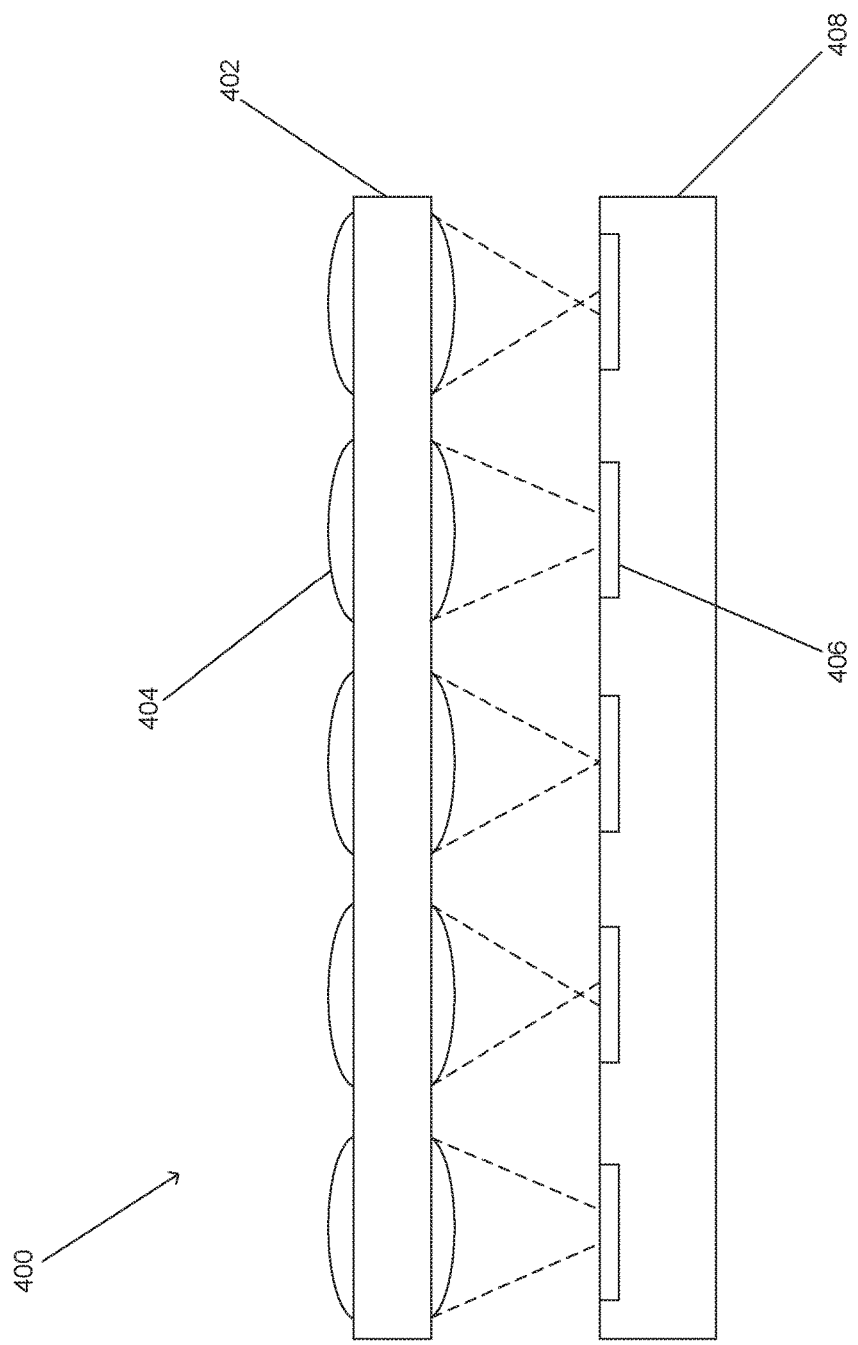
FIG. 4 conceptually illustrates variations in focal length that can occur during the manufacture of a camera module using a lens stack array and a sensor in accordance with embodiments of the invention.

The variations in focal length that can occur in a conventional lens stack array are conceptually illustrated in FIG. 4. The array camera module 400 includes a lens stack array 402 in which lens stacks 404 focus light on the focal planes 406 of sensor 408. As is illustrated, variance between the actually fabricated lens stack and its original prescription can result in the lens stack having a focal length that varies slightly from its prescription and consequently an image distance that does not correspond with the distance between the lens stack array and the sensor. Accordingly, the images formed on the focal planes of the sensor can be out of focus. In addition, other manufacturing tolerances associated with the assembly of the array camera module including (but not limited to) variations in spacer thickness and alignment of the lens stack array relative to the sensor can impact all of the optical channels.

Active Alignment Processes

Figure 5:
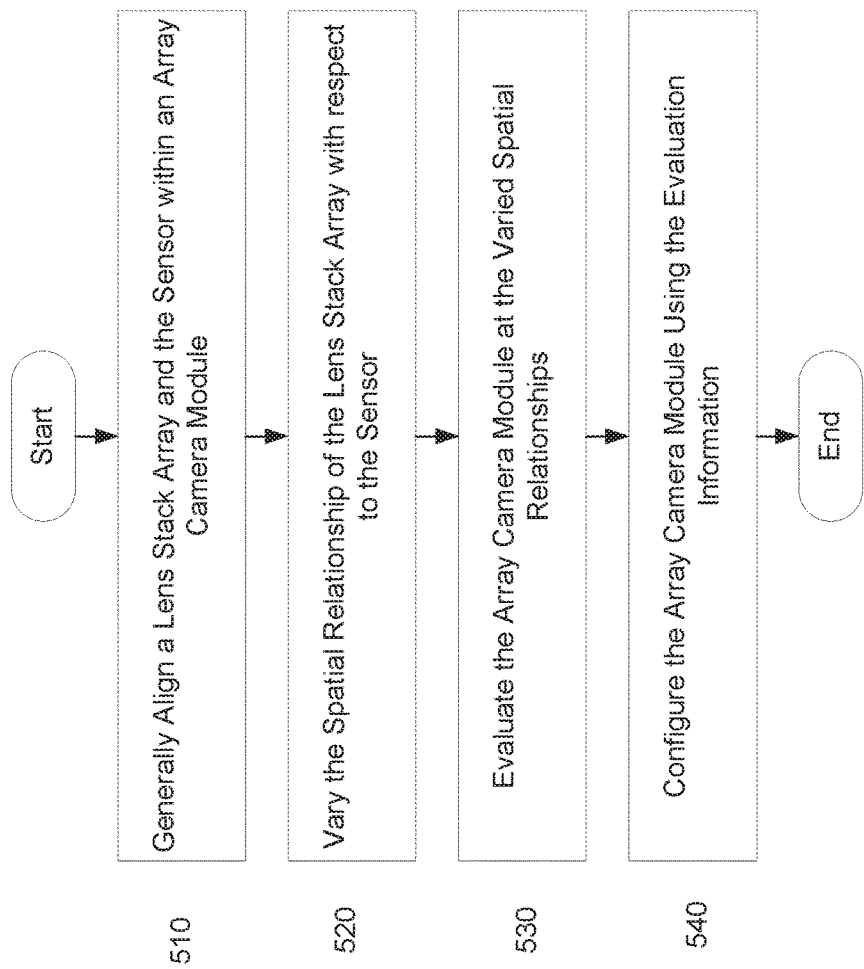
FIG. 5 is a flowchart that illustrates a process for actively aligning a lens stack array and a sensor including an array of corresponding focal planes in accordance with an embodiment of the invention.

In many embodiments, processes for actively aligning a lens stack array with a sensor to construct an array camera module involve reading image data captured by multiple focal planes on the sensor as the lens stack array is moved relative to the sensor. The image data can be utilized to evaluate the resulting image quality at different spatial relationships between the sensor and the lens stack array and the spatial relationship that provides a predetermined threshold level of image quality can be utilized to construct the camera module. A process that actively aligns a lens stack array with a sensor by generally aligning the two, varying their spatial relationship, evaluating the resulting configuration during the variation, and configuring the array camera module using the evaluation data in accordance with an embodiment of the invention is illustrated in FIG. 5.

A lens stack array is generally aligned (510) with a corresponding sensor that has multiple focal planes. The combination is aligned so that each camera within the configuration is capable of capturing and recording images. The spatial relationship of the lens stack array with respect to the sensor is varied (520). In several embodiments, the variation is achieved by sweeping the lens stack array with respect to the sensor. Sweeping can be understood to mean moving one component (i.e. either the lens stack array or the sensor) in relation to the other over time. Sweeping may be in one degree of freedom or it can be across many degrees of freedom. As can readily be appreciated, the array nature of the camera module means that variations in the x, y, and z-directions, and tip/tilt and rotation of the lens stack array with respect to the sensor can all have significant impact on the imaged data captured by the focal planes on the sensor. Note that in many array cameras, focus and consequently sharpness of the cameras is primarily affected by the z-direction and the tip/tilt of the lens stack array with respect to the sensor, with the tip/tilt principally affecting the performance of the corner cameras. Conversely, in a conventional camera that comprises only a single lens stack, the image quality of the camera is primarily driven by the optical system's 'z-position' with respect to the sensor. In many embodiments, the path of the sweep is predetermined.

The quality of the captured image data is evaluated (530) at the varied spatial relationships. For example, in several embodiments of the invention, the configuration is intermittently evaluated during a sweep of the lens stack array with respect to the sensor. In many embodiments, the configuration is evaluated by evaluating multiple cameras' captured and recorded images of a known target at the varied spatial relationships. In several embodiments, only a subset of the configuration's cameras is used for evaluation purposes. An MTF score may be determined for each recorded image and used to evaluate a respective camera at a respective spatial orientation. The recorded images may also be evaluated at its different ROIs. For example, an MTF score may be assigned to each ROI within a recorded image.

The array camera module is configured (540) using the information obtained during evaluation. In some embodiments, the configuration involves concluding a spatial relationship between the lens stack array and the sensor that results in the corresponding array camera module being able to capture and record images that exceed a threshold quality. The configuration may also involve disabling cameras that do not surpass a threshold quality. Again, because array camera modules include a plurality of cameras, they can still function even when several of the cameras are disabled. The advantage of being able to disable a camera is that the average performance of the array including the camera may be much lower than the average performance of the remaining cameras when the disabled camera is excluded from consideration in determining the appropriate alignment of the lens stack array and sensor.

Although a process, and its variants, have been described that actively align a lens stack array with a corresponding array of focal planes, any of a number of different processes may be used to actively align a lens stack array with an array of focal planes in accordance with embodiments of the invention. An initial configuration for an active alignment process in accordance with embodiments of the invention is discussed below.

Figure 6:
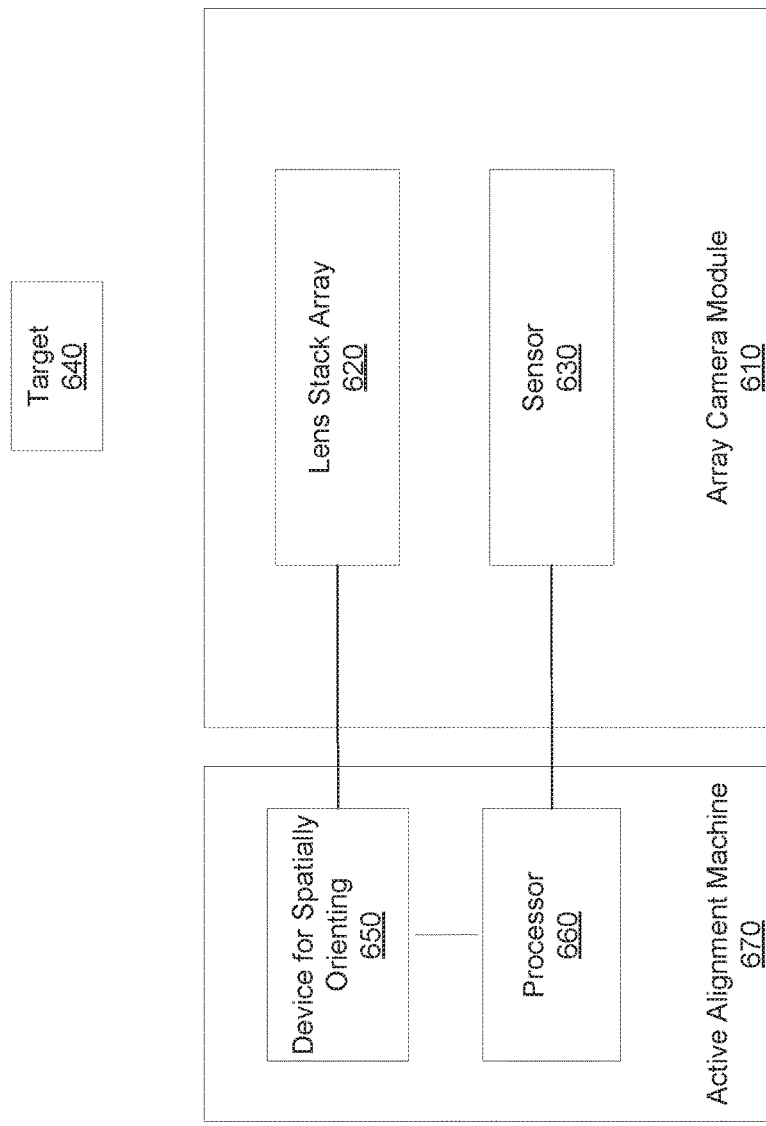
FIG. 6 schematically illustrates an initial configuration that may be used to actively align a lens stack array with a sensor in accordance with an embodiment of the invention.

Initial Configuration for Aligning a Lens Stack Array with an Array of Focal Planes Active alignment processes may begin from any number of initial configurations in accordance with embodiments of the invention. An initial configuration for an active alignment process where a device that is capable of orienting a lens stack array is connected to a lens stack array of a corresponding array camera module, a processor is connected to the corresponding sensor, and a target is positioned and illuminated so that the array camera module can capture and record it in accordance with an embodiment of the invention is illustrated in FIG. 6. The array camera module 610 includes a lens stack array 620 and a sensor 630 that has corresponding focal planes. The lens stack array and the sensor are generally aligned so that they are capable of capturing and recording images of the target 640. A device that is capable of spatially orienting the lens stack array 640 is connected to the lens stack array 620, and a processor 660 is connected to the sensor. Thus, the processor 660 is capable of capturing and recording images from the sensor 630, while the orientation of the lens stack array 620 is being varied, and the active alignment process can thereby be implemented. The combination of the device for spatially orienting the lens stack array 650 and the processor 660 can be understood to be an active alignment machine 670.

In many embodiments, the initial configuration involves generally aligning the lens stack array 620 and the sensor 630 so as to ensure that the lens stack array 620 and the sensor 630 are in sufficient translational and rotational alignment such that each lens stack is generally aligned with its corresponding focal plane. Translational motion here refers to motion of a system (i.e. the lens stack array 620 or the sensor 630) in a direction parallel to its respective surface. Rotation here refers to rotation of a system about the Z-axis (i.e. the axis defining the distance between the sensor and the lens stack array) relative to the other. General alignment may be achieved by, for example, monitoring a central feature on a test chart, and moving either the lens stack array or the sensor in translation (with respect to the other system) such that the central feature is centrally located within the central camera modules; this would indicate that the systems are in sufficient translational alignment. Either system may then be rotated with respect to the other so that the midpoints of each lens stack array and its corresponding focal plane define a line that runs generally parallel to the Z-axis. During this rotational adjustment, the systems may also be readjusted to preserve (or enhance) adequate translational alignment. In this way, each lens stack array may be generally aligned with its corresponding focal plane.

Although many embodiments of the invention employ the initial configuration illustrated in FIG. 6, many other embodiments employ other initial configurations appropriate to the requirements of specific applications. In accordance with embodiments of the invention, any initial configuration may be implemented that allows the spatial relationship between the lens stack array and the sensor to be varied, and further allows the corresponding array camera module to be evaluated, manipulated, and configured based on an evaluation of it. The varying of spatial relationships between the lens stack array and the sensor in accordance with embodiments of the invention is discussed below.

Figure 7:
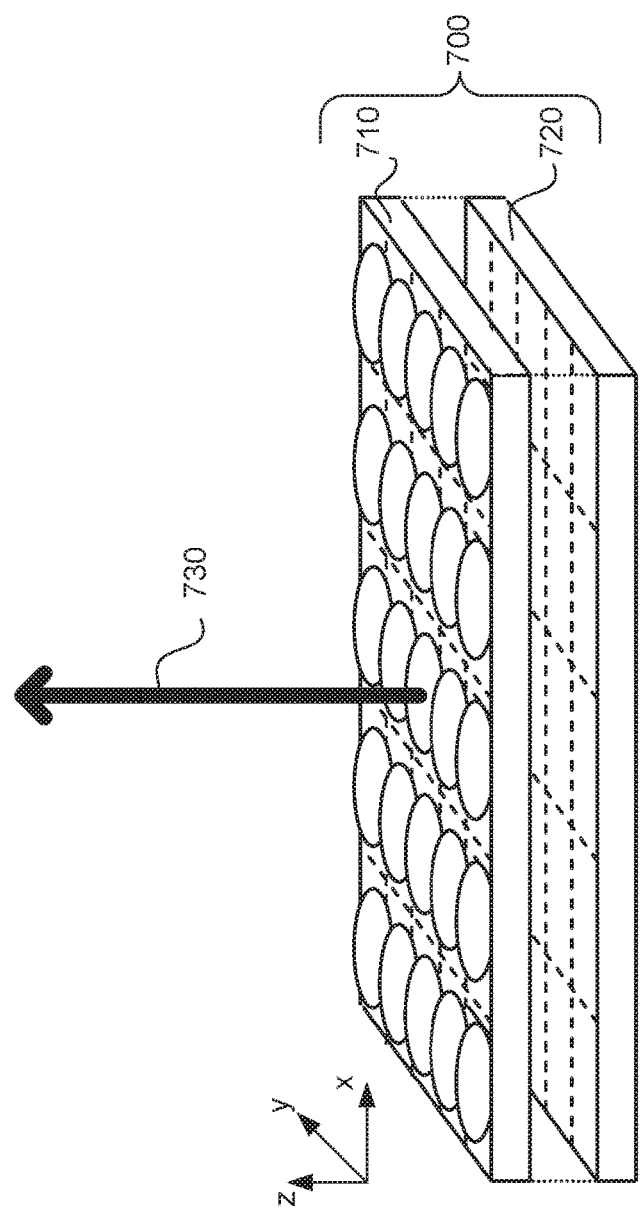
FIG. 7 illustrates sweeping a lens stack array with respect to a sensor in accordance with an embodiment of the invention.

Varying the Spatial Relationship of the Lens Stack Array with Respect to the Sensor The spatial relationship between a lens stack array and a corresponding sensor may be varied in any number of ways. For example, an active alignment process where a lens stack array is swept in a direction substantially normal to the sensor's planar surface in accordance with embodiments of the invention is illustrated in FIG. 7. An array camera module 700 includes a lens stack array 710 and a corresponding sensor 720 with an array of focal planes, and the active alignment process sweeps the lens stack array 710 in a predetermined direction 730 substantially normal to the sensor's surface (the z-direction). Note that sweeping the lens stack array in this fashion systematically varies the focus of each camera—typically cameras will be swept in focus and then out of focus. The array camera module may be evaluated on the varied spatial relationships along this sweep. Active alignment processes in accordance with embodiments of the invention can also include tipping, tilting, and/or rotating the lens stack array with respect to the sensor. In many embodiments, only the distance between the lens stack array and the sensor is varied in a sweep referred to as a "through focus sweep" and all relevant calculations to determine the optimum alignment (including centering as well as focus and tip/tilt) are made from images captured during the through focus sweep using the respective curve fittings and center of gravity calculations, respectively. As can be appreciated, a through focus sweep of a skewed lens stack array already provides information about the optimum tip/tilt of the lens stack array relative to the sensor by the appropriate plane fitting calculations of the peak focus positions or equalized MTF, respectively. These calculations are discussed further below.

In several embodiments, the manner in which the spatial relationship varies is computationally determined. For example, the manner in which the spatial relationship varies may be determined computationally based upon an initial evaluation of the array camera module. Additionally, the manner in which the spatial relationship varies may change during an active alignment process. For instance, after the lens stack array has been swept in a direction substantially normal to the sensor's planar surface, a processor may compute a different sweeping path that may facilitate a better configuration of the array camera module.

Although several examples have been described related to how the spatial relationship between the lens stack array and the sensor may be varied, the spatial relationship may also be varied in any number of other ways in accordance with embodiments of the invention. The evaluation of the array camera module at the varied spatial relationships is discussed below.

Evaluating the Array Camera Module

In numerous embodiments, evaluating the array camera module during the active alignment process involves having multiple cameras capture and record images of a known target, and evaluating these images. The images may be evaluated by assessing their focus, for example. The assessment of the focus may be performed in any number of ways in accordance with embodiments of the invention. For example, in many embodiments, an MTF score may be determined for a given recorded image. Generally speaking, an MTF score is an advantageous metric insofar as MTF scores amongst different cameras can be directly compared with one another. In some embodiments, a recorded image may be given a 'focus score' which can similarly be used to evaluate the recorded image. For example, a focus score may be determined by convolving a kernel over contrasting features in an image, where the resulting value is related to the camera's ability to focus. Unlike the MTF score, a focus score may not necessarily be directly comparable to such scores from different cameras; instead a focus score may be more useful in evaluating a single camera.

The selection of which scoring metric to use may be determined, in part, by the speed in which the scores can be calculated. For instance, if it takes longer to compute an MTF score than to compute a focus score, the focus score may be used in the evaluation. The selection of which scoring metric to use may also be determined, in part, by the accuracy and precision of the score. For instance, if the MTF score is a more precise means for evaluating image quality, then it may be used to evaluate the camera images. Moreover, the active alignment process may utilize several methods of evaluating a recorded image, and these methods may not necessarily be concurrent. For example, an evaluation based on focus scoring may be initially used, whereas an evaluation based on an MTF score may later be used. Additionally, the active alignment process may involve relating the different scoring metrics. For example, focus scoring may be used to evaluate the set of images recorded by an array camera, and MTF scoring may be used to evaluate a representative subset of those images. The MTF scores for the subset may then be normalized to the respective focus scores. And this determined relationship may be used to determine MTF scores for the remaining images.

Figure 8:
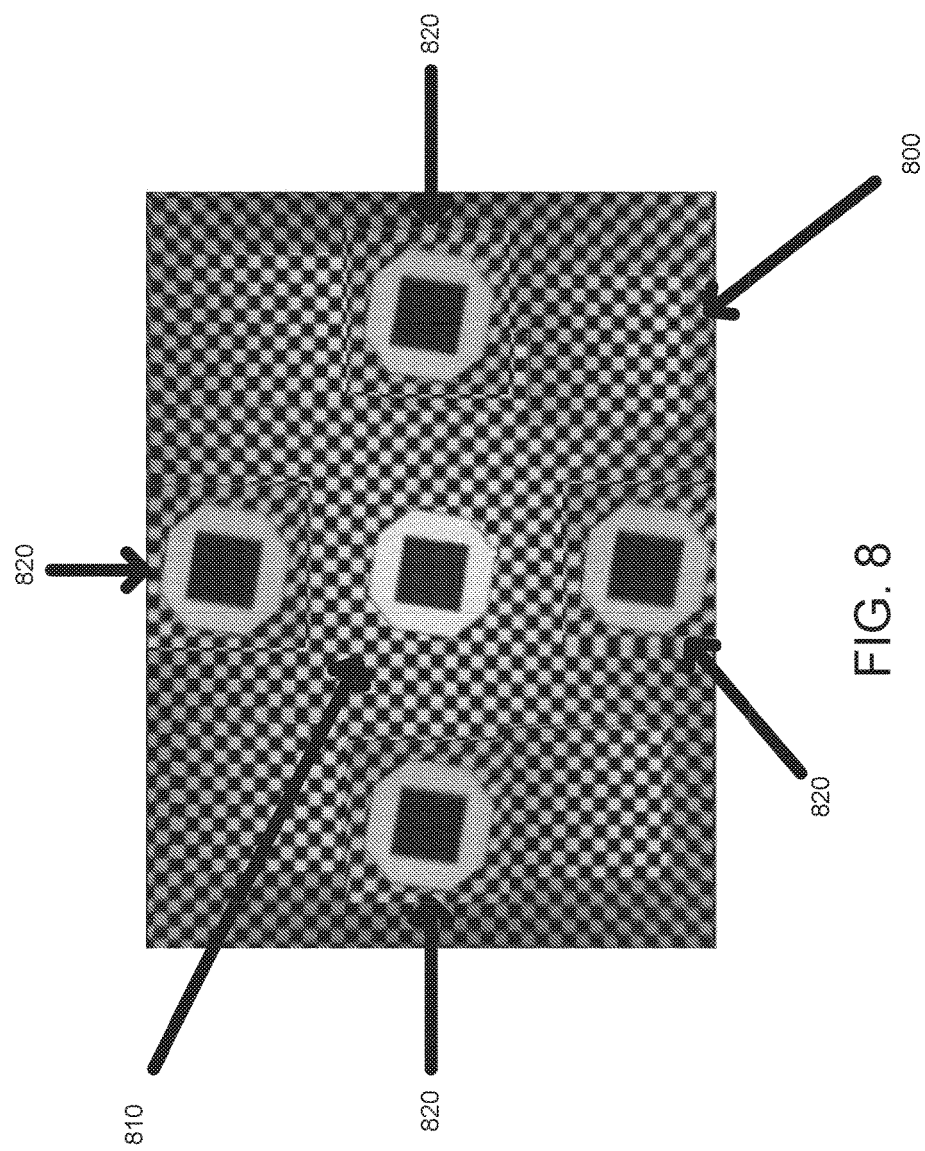
FIG. 8 illustrates a target that may be used during active alignment in accordance with many embodiments of the invention.

Additionally, different regions of recorded images may be evaluated, thereby providing information on a camera's quality as to specific regions. For example, in certain embodiments, images are recorded of a known target that has multiple "Regions of Interest" (ROIs), and the cameras' recorded images of the known target are evaluated with respect to each region of interest. FIG. 8 illustrates a known target used in accordance with many embodiments of the invention. The known target 800 includes a central feature 810 that highlights a central ROI, also known as an "on-axis" ROI. The known target further includes features 820 that highlight "off-axis" ROIs. The target in FIG. 8 is advantageous in so far as the edges of the features are oriented in such a way that the tangential and sagittal components of the MTF score, and thus also the astigmatism, can be directly derived and compared to prior lens test data. Thus, many embodiments utilize the known target illustrated in FIG. 8 by evaluating the quality of each camera with respect to each of the five ROIs.

The target illustrated in FIG. 8 may also be used in determining a focus score. Specifically, the determination of a focus score in conjunction with this target may involve convolving a kernel over areas of the image with contrasting features for each region of interest (e.g. the checkerboard patterns 840 or the dark slanted square against the light background 850), wherein the resulting value is proportional to the contrast between the features. For example, the following convolution kernel may be employed:

|−1, −1, −1, −1, −1|
|−1, −1, −1, −1, −1|
|−1, −1, 24, −1, −1|
|−1, −1, −1, −1, −1|
|−1, −1, −1, −1, −1|

This convolution kernel will yield values that are proportional to a camera's ability to resolve contrast. Note that the value will either be positive or negative depending on whether the region being evaluated is transitioning from light to dark or dark to light. However, whether a region of interest is transitioning from light to dark or vice versa is irrelevant to a camera's ability to focus; therefore the absolute value of these values should be obtained. Then, a focus score for each ROI may be obtained by averaging these absolute values for each ROI.

Although, FIG. 8 illustrates a particular known target that may be used in accordance with embodiments of the invention, many other embodiments utilize other known targets appropriate to the requirements of specific applications. For instance, the off-axis ROIs may be placed in the corners of the target—this allows the performance of the camera to be tested at larger field heights. In the illustrated embodiment, the ROIs have the advantage that the edges of the features are oriented in such a way that the tangential and sagittal components of the MTF and thus also the astigmatism can be directly derived and compared to prior lens test data. Moreover, although specific examples of how a focus score may be generated are provided, any of a variety of techniques can be used to generate a focus score. More generally, the evaluation techniques herein described are merely illustrative. Any techniques for evaluating the efficacy of an array camera module may be incorporated in accordance with embodiments of the invention. Using the evaluation data to configure the array camera module is discussed below.

Configuring the Array Camera Module

Evaluation data may be used to configure the array camera module in a number of respects. In many embodiments the array camera module is configured to minimize the detrimental impact caused by variance of focal length within a lens stack array. As described above, variance within a lens stack array may be caused by manufacturing process variations including (but not limited to) those that affect the following parameters: the radius of curvature in individual lenses, the conic, higher order aspheric coefficient, refractive index, thickness of the base layer, and/or overall lens height. Additionally, as described above, the following manufacturing variations related to the fabrication of multiple lens stack arrays and camera modules may further exacerbate the variability in back focal lengths: the thickness of the lens substrates and spacers employed in the stack, especially those toward the sensor cover glass, the thickness of the sensor cover glass used, bond line thickness between the lens spacer and the sensor cover glass, and any air gap between the sensor and the sensor cover glass. Thus, many embodiments evaluate the quality of each camera as a function of its spatial relationship to the sensor; thereafter, the information is used to orient the lens stack array with respect to the sensor so that any deterioration in the quality of the array camera due to the variance in focal length within the lens stack array is lessened.

Several embodiments generate mathematical equations that approximately characterize data related to camera quality as a function of spatial relationship, and use the derived equations to compute a desired spatial relationship that lessens the detrimental impact of variance in focal length. For example, some embodiments generate polynomial equations that approximately model the focal scoring data. Note that because of the nature of optics, each lens will typically have a peak focal value, and therefore polynomial equations are well suited to characterize the data. In many embodiments, the polynomial equations are generated by determining coefficients for predetermined generic polynomial equations (i.e. those with undetermined coefficients), such that the resulting equation approximately characterizes the data relating the camera quality to the spatial relationship. Many embodiments then use these derived equations to compute a best fit plane that characterizes a spatial relationship that reduces the detrimental impact of variance in focal length.

Notably, the best-fit planes may be computed in any number of ways. For instance, the best-fit plane may be computed to be a plane that includes an approximation of the peak values of the polynomial equations that characterize focal scoring data as a function of the spatial relationship. But, as described above, focal scoring data may not necessarily be directly comparable across different cameras. Therefore, best-fit planes may also be computed by generating equivalent MTF scores, and determining a plane that maximizes the mean MTF score while minimizing its variance. Specifically, the best-fit planes may be computed to determine a plane wherein the MTF scores amongst the different lens stacks are equalized within some specified tolerance. Moreover, any number of balancing algorithms may be employed to effectuate this computation as appropriate to the requirements of a specific application. The determination of these planes may then be used to facilitate the configuration of the array camera module.

In several embodiments, the configuration process involves orienting the lens stack array with respect to the sensor to form an array camera module that is capable of achieving pictures that have desired characteristics. In some embodiments, the lens stack array is oriented with respect to the sensor so as to achieve an array camera module that is capable of recording images, wherein the quality of the on-axis aspects of the recorded image exceeds a specified threshold criterion. In several embodiments, the lens stack array is actively aligned with respect to the sensor to achieve an array camera module that is capable of recording images, wherein the quality of the off-axis aspects of the recorded image exceeds a specified threshold criterion. Note also that in various embodiments, the configuration process may involve disabling cameras that are above a certain threshold quality so as to avoid biasing the best fit plane determination. In numerous embodiments, the lens stack array is actively aligned with respect to the sensor to achieve an array camera module that is capable of recording images, wherein the quality of both on-axis and off-axis regions of interest exceed respective specified threshold qualities.

In many embodiments, the configuration process involves disabling cameras that perform above or below a certain defined threshold quality. Again, because an array camera module has many cameras, it is possible for it to maintain functionality even when some of its cameras are non-functional. In several embodiments, cameras are disabled when their quality, as determined by their ability to focus sharply when in a given spatial orientation, is above or below a threshold value. For example, some embodiments determine whether a camera should be disabled by evaluating an MTF score of its respective recorded images. In many embodiments, if the number of disabled cameras exceeds a specified value, then the array camera module is designated unacceptable. In several embodiments, different threshold values can be specified for different types of cameras within the array camera module. For example, in a number of embodiments that employ π filter groups, different threshold values can be specified for the green cameras, the red cameras, and the blue cameras.

In various embodiments, information obtained during the evaluation aspect of the active alignment process is used to configure the functionality of the each camera. For example, if it is determined that a particular camera has a focal length that makes it better suited to record images of objects that are at a further distance, the array camera module can be configured to rely more heavily on that camera when synthesizing recorded images of objects at further distances.

The above descriptions regarding configuring an array camera module in accordance with embodiments of the invention is not meant to be exhaustive. Indeed, array camera modules can be configured in any number of ways based on evaluations of the configuration in accordance with embodiments of the invention. Active alignment processes that configure array camera modules so that they are capable of capturing and recording images that have desirable image properties are discussed below.

Figure 9:
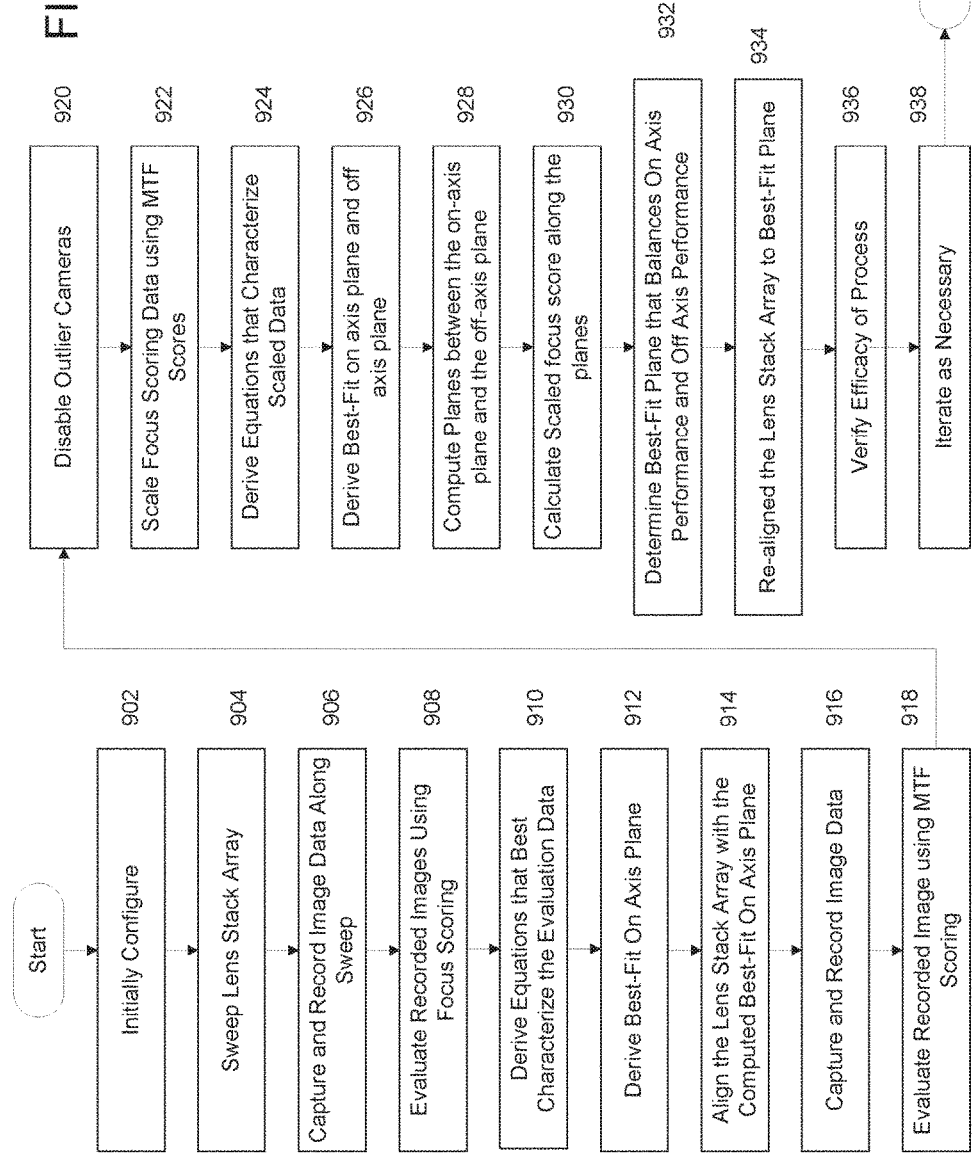
FIG. 9 is a flowchart that illustrates an active alignment process that uses an iterative computation process to yield an array camera module that is capable of capturing and recording images that have sufficient on-axis and off-axis performance in accordance with an embodiment of the invention.

Active Alignment Processes that Yield Array Camera Modules Capable of Recording Images that have Desirable Characteristics Active alignment processes in accordance with embodiments of the invention can use a variety of metrics to evaluate the image data that is captured during the active alignment process. In several embodiments, the active alignment process can optimize image quality in specific regions of the captured images, can optimize image quality in multiple regions of interest and/or can utilize a variety of metrics including (but not limited to) focus scoring and MTF scoring. An active alignment process that uses an iterative computation process to yield an array camera module that is capable of capturing and recording images that have sufficient on-axis and off-axis performance in accordance with an embodiment of the invention is illustrated in FIG. 9.

The process is initially configured (902) so that a lens stack array and a corresponding sensor are mounted to an active alignment machine in a manner similar to that seen in FIG. 6, so that they are generally operable as an array camera. This may include generally aligning the lens stack array with its corresponding sensor, which itself may include verifying that the lens stack array and the sensor are in sufficient rotational alignment such that each lens stack is generally aligned with its corresponding focal plane, as described above. A known target with an on-axis ROI and off-axis ROIs (similar to that depicted in FIG. 8) is positioned and illuminated so that the array camera module may capture and record its image. The initial configuration may also include deactivating specific cameras in a predetermined fashion so that they do not record images during the alignment process.

The lens stack array is swept (904) in a direction normal to the sensor's planar surface, in a manner similar to that seen in FIG. 7, and may be swept for a predetermined distance. During the sweep, the active cameras intermittently capture and record (906) images of the known target. The processor evaluates (908) the recorded images and assigns a 'focus score' for each region of interest in each recorded image for each camera. Polynomial equations are derived (910) for each region of interest captured by each camera that best characterizes the focus score as a function of the camera's distance from the sensor. In some embodiments, the polynomial equations are derived by calculating coefficients for a given a predetermined generic polynomial equation (i.e. a polynomial equation with undetermined coefficients). The polynomial equations will typically have a peak value.

An "on-axis best fit plane" is derived (912) using the peak values of the polynomial equations. The on-axis best fit plane, is characterized in that it maximizes the peak values corresponding to the active cameras and/or minimizes the variance in the peak values.

The lens stack array is then aligned (914) with the computed best fit on-axis plane. Each active camera captures and records (916) an image of the known target. Each recorded image is then evaluated (918) by determining an MTF score for each ROI. Cameras that do not meet a threshold MTF score are disabled (920). For example, any cameras that do not have an MTF score within 20% of the median on-axis MTF score may be disabled, and subsequently excluded from further alignment position calculations. This threshold may of course be configurable. In other embodiments, other criteria are utilized to determine which cameras should be disabled. Moreover, if a specified number of cameras are disabled, the array camera is deemed unacceptable.

Assuming the camera is not deemed unacceptable, the previously acquired focus scoring data is scaled (922) using the peak focus score and MTF scores. For example, the MTF Score may be scaled in accordance with the following formula:

$$\text{Scaled Focus Score}_z = (\text{Focus Score}_z / \text{Peak Focus Score}) * \text{MTF Score}$$

where the z subscript reflects the score at a particular z-position.

The focus scoring data (absolute values) are exposure/signal-level dependent. Thus different cameras (e.g. blue, green, red cameras) will have different absolute focus score peak values due to their different signal levels. However, MTF is a metric that is invariant to signal level. Thus, MTF enables the curves for focus score to be normalized such that the curve derived from focus score can also be used to compare each camera's peak performance and not only the position at which peak performance occurs. In other embodiments, any of a variety of metrics appropriate to a specific application can be utilized in determining camera peak performance.

As before, polynomial curves may then be derived (924) that characterize the scaled focus scores. Thus, each active camera will be characterized by polynomial equations that characterize the camera's ability to resolve each respective region of interest. Given these new polynomial equations, a best-fit on axis plane and a best-fit off axis plane are derived (926); in this instance, the best-fit planes are characterized in that they approximately maximize the mean MTF scores while minimizing their variance. A configurable number of planes that are evenly spaced between the two best-fit planes (on-axis and off-axis) are computed (928). Scaled focus scores for each camera at their respective corresponding positions along each of those planes are calculated (930). A best-fit plane determined (932) wherein any deviation toward the best-fit off axis plane causes a gain in the off-axis scaled focus score and a loss in the on-axis scaled score, wherein the ratio of the off-axis score gain to the on-axis score loss falls below a configurable threshold. The lens stack array is then re-aligned (934) with this computed plane.

The efficacy of the process is verified (936). This may be accomplished by, for example, having each active camera record an image of the known target, determining an MTF score for each ROI within that image, and ensuring that each MTF score surpasses some threshold calculation.

The processes described may be iterated (938) until a desired configuration is achieved.

Although a particular process, and its variants, is discussed above, any number of processes may be used to achieve an array camera module that is capable of capturing and recording images that have adequate on-axis and off-axis performance in accordance with embodiments of the invention. Moreover, although the discussed process regards adequately balancing on-axis and off-axis performance of an array camera module, active alignment processes can be tailored to achieve any number of desirable picture characteristics in accordance with embodiments of the invention.

Although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A method comprising:
    providing a lens stack array having a plurality of active focal planes in conjunction with a sensor, where each focal plane comprises a plurality of rows of pixels that also form a plurality of columns of pixels and each focal plane is contained within a region of the lens stack array that does not contain pixels from another focal plane;
    capturing images of a known target using the plurality of active focal planes at different spatial relationships between the lens stack array and the sensor, where the lens stack array comprises a plurality of lens stacks, and where each lens stack corresponds to a focal plane of the plurality of focal planes;
    scoring the images captured by the plurality of active focal planes, where the resulting scores provide a direct comparison of the extent to which a central and a peripheral region of interest are each focused in each of the images at each of the spatial relationships, and where the resulting scores are indicative of each active lens stack's ability to focus;
    comparing the resulting scores of captured images, wherein the comparison of scores further comprises computing:
        a first best-fit plane that defines a spatial relationship between the lens stack array and the sensor based on each active lens stack's ability to focus on the central region of interest according to a first predetermined criterion;

a second best-fit plane that defines a spatial relationship between the lens stack array and the sensor based on each active lens stack's ability to focus on the peripheral region of interest according to a second predetermined criterion; and at least a third intervening plane between the first and second best-fit planes; and determining a final spatial relationship arrangement between the lens stack array and the sensor utilizing the comparison of the scores wherein the images are scored such that a score is provided for each region of interest visible in each image, the score being indicative of the extent to which the respective region of interest is focused in the image; and the comparison of scores comprises determining mathematical relationships for each of a plurality of active focal planes that characterize the relationships between:

the scores of the extent to which the central region of interest is focused in the images captured by the respective active focal plane and the spatial relationship between the lens stack array and the sensor; and the scores of the extent to which the at least one peripheral region of interest is focused in the images captured by the respective active focal plane and the spatial relationship between the lens stack array and the sensor.

2. The method of claim 1, wherein scoring the images captured by the plurality of active focal planes comprises computing modulation transfer function (MTF) scores for the images.

3. The method of claim 1, wherein the comparison of the scores of images captured by a plurality of the active focal planes is based upon:

a comparison of the scores of the images captured by a plurality of the active focal planes at the selected spatial relationship to the scores of images captured by the same active focal planes at different spatial relationships; and the variation between the scores of the images captured by the active focal planes at the selected spatial relationship.

4. The method of claim 1, wherein the comparison of scores comprises omitting from consideration an image captured by an active focal plane, when the score of the image captured by the active focal plane fails to satisfy at least a third predetermined criterion.

5. The method of claim 4, wherein the at least third predetermined criterion includes the score of the image captured by the active focal plane being within a predetermined range.

6. The method of claim 4, further comprising deactivating an active focal plane, when the score of the image captured by the active focal plane fails to satisfy the at least third predetermined criterion.

7. The method of claim 1 further comprising varying the spatial relationship between the lens stack array and the sensor.

8. The method of claim 1, wherein the final spatial relationship arrangement minimizes the variance of the scores between the images of the plurality of active focal planes.

9. The method of claim 1, wherein the first predetermined criterion is based upon:

at each spatial relationship defined by the computed planes, averaging the scores indicative of the extent to which the central region of interest is focused, the scores being averaged across all active focal planes at the respective spatial relationship; and assessing the variance in the average scores between the spatial relationships.

10. The method of claim 7, wherein varying the spatial relationship between the lens stack array and the sensor involves sweeping the lens stack array relative to the sensor.

11. The method of claim 10, wherein the lens stack array is swept in a direction substantially normal to the surface of the sensor.

12. The method of claim 1, wherein a spatial relationship between the lens stack array and the sensor is selected to be used when constructing an array camera module based upon the final spatial relationship arrangement.

13. The method of claim 1, wherein the second predetermined criterion is based upon:

at each spatial relationship defined by the computed planes, averaging the scores indicative of the extent to which the peripheral region of interest is focused, the scores being averaged across all active focal planes at the respective spatial relationship; and assessing the variance in the average scores between the spatial relationships.

14. The method of claim 1, wherein the ability to focus of a first active lens stack's ability to focus varies from a second active lens stack.

15. The method of claim 14, wherein the variance in ability to focus between the first and second lens stack is due to a manufacturing process.

* * * * *